(12) United States Patent
Kihara et al.

(10) Patent No.: US 10,860,047 B2
(45) Date of Patent: Dec. 8, 2020

(54) PEDAL DEVICE

(71) Applicant: DENSO CORPORATION, Kariya (JP)

(72) Inventors: Noriyasu Kihara, Kariya (JP);
Haruhiko Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/361,326

(22) Filed: Mar. 22, 2019

(65) Prior Publication Data

US 2019/0220052 A1     Jul. 18, 2019

Related U.S. Application Data

(63) Continuation of application No. PCT/JP2017/027377, filed on Jul. 28, 2017.

(30) Foreign Application Priority Data

Sep. 28, 2016  (JP) ................................. 2016-189181

(51) Int. Cl.
  *G05G 1/38*  (2008.04)
  *G05G 1/30*  (2008.04)
  (Continued)

(52) U.S. Cl.
  CPC ............... *G05G 1/30* (2013.01); *B60K 26/02* (2013.01); *B60T 7/02* (2013.01); *B60T 7/06* (2013.01);
  (Continued)

(58) Field of Classification Search
  CPC ...................................................... G05G 1/38
  See application file for complete search history.

(56) References Cited

U.S. PATENT DOCUMENTS

| 4,888,997 | A | * | 12/1989 | Eckert | ..................... B60T 7/042 |
| | | | | | 73/862.382 |
| 4,970,486 | A | * | 11/1990 | Gray | ....................... B60T 7/042 |
| | | | | | 338/108 |

(Continued)

FOREIGN PATENT DOCUMENTS

| CN | 103115711 B | * | 1/2015 |
| JP | S61-171837 | | 8/1986 |

(Continued)

OTHER PUBLICATIONS

Machine Translation of CN 103115711, obtained Aug. 16, 2019.*

(Continued)

*Primary Examiner* — Richard W Ridley
*Assistant Examiner* — Brian J McGovern
(74) *Attorney, Agent, or Firm* — Nixon & Vanderhye P.C.

(57) ABSTRACT

An accelerator device includes a pedal pad and a strain gauge. When a driver of a vehicle having the accelerator device depresses the pedal pad, the pedal pad is deformed in a direction of a blank arrow. The strain gauge senses the displacement amount of the pedal pad in the direction of the blank arrow and outputs an electric signal, which corresponds to the displacement amount, to an outside as the depression amount of the accelerator device. When the driver removes a foot from the pedal pad, the pedal pad returns to a state of the pedal pad that is not depressed by the driver. Therefore, it is possible to limit occurrence of that the depression amount of the pedal pad becomes an unintended value due to, for example, catching of the pedal pad by a floor mat. As a result, the accelerator device can reliably sense the depression amount.

18 Claims, 25 Drawing Sheets

(51) Int. Cl.
G05G 5/03 (2008.04)
B60T 7/02 (2006.01)
B60T 7/06 (2006.01)
B60K 26/02 (2006.01)
B60K 23/02 (2006.01)

(52) U.S. Cl.
CPC ............... *G05G 1/38* (2013.01); *G05G 5/03* (2013.01); *B60K 23/02* (2013.01)

(56) References Cited

U.S. PATENT DOCUMENTS

| | | | | |
|---|---|---|---|---|
| 5,564,797 | A | * | 10/1996 | Steiner ............ B60T 7/06 303/113.4 |
| 6,571,662 | B1 | * | 6/2003 | Mendis ............ B60K 23/02 307/10.1 |
| 2004/0040408 | A1 | * | 3/2004 | Shaw ............ G05G 1/36 74/560 |
| 2007/0296268 | A1 | * | 12/2007 | Shaw ............ B60T 7/042 303/20 |
| 2008/0223171 | A1 | * | 9/2008 | Fujiwara ............ G01L 1/2237 74/512 |
| 2010/0071500 | A1 | | 3/2010 | Ohtsubo et al. |
| 2010/0107805 | A1 | * | 5/2010 | Bryce ............ B60T 7/042 74/519 |
| 2014/0311277 | A1 | * | 10/2014 | Fujiwara ............ G05G 1/38 74/512 |
| 2015/0007684 | A1 | | 1/2015 | Saito et al. |
| 2018/0058837 | A1 | * | 3/2018 | Dektor ............ H03K 17/9625 |
| 2019/0163226 | A1 | * | 5/2019 | Kihara ............ F02D 11/02 |

FOREIGN PATENT DOCUMENTS

| | | |
|---|---|---|
| JP | 2006-236179 | 9/2006 |
| JP | 2011-170457 | 9/2011 |
| JP | 2012-183967 | 9/2012 |
| JP | 2013-119264 | 6/2013 |

OTHER PUBLICATIONS

"Wheatstone bridge," Wikipedia page, url: <https://en.wikipedia.org/wiki/Wheatstone_bridge>, obtained May 9, 2020.*

* cited by examiner

US 10,860,047 B2

PEDAL DEVICE

CROSS REFERENCE TO RELATED APPLICATIONS

This application is a continuation application of International Patent Application No. PCT/JP2017/027377 filed on Jul. 28, 2017, which designated the U.S. and claims the benefit of priority from Japanese Patent Application No. 2016-189181 filed on Sep. 28, 2016. The entire disclosures of all of the above applications are incorporated herein by reference.

TECHNICAL FIELD

The present disclosure relates to a pedal device.

BACKGROUND

Previously, there is known a pedal device that controls an operational state of a vehicle according to a force (hereinafter, referred to as a depressing force) applied from a driver of the vehicle to depress a pedal.

SUMMARY

According to the present disclosure, there is provided a pedal device that includes a pedal pad and a displacement amount sensor device, while the displacement amount sensor device is configured to sense a displacement amount of the pedal pad.

BRIEF DESCRIPTION OF DRAWINGS

The present disclosure, together with additional objectives, features and advantages thereof, will be best understood from the following description in view of the accompanying drawings.

DETAILED DESCRIPTION

Previously, there is known a pedal device that controls an operational state of a vehicle according to a force (hereinafter, referred to as a depressing force) applied from a driver of the vehicle to depress a pedal. For example, there is a pedal device that includes: a pedal; a support portion that rotatably supports one end part of the pedal; an expandable and contractible member that is made of an expandable and contractible material and is placed between the pedal and a vehicle body; and a displacement amount sensor device that senses the displacement amount of the expandable and contractible member.

However, in the pedal device described above, in a case where an object, such as a floor mat, is caught by the pedal at the time of depressing the pedal, the pedal cannot rotate about the support portion even when the foot is released from the pedal. Thereby, in such a case, the pedal may not return to an original position. Therefore, the expandable and contractible member is kept compressed, and the operation amount of the pedal, which is computed based on the displacement amount of the expandable and contractible member, becomes an unintended value.

According to the present disclosure, a pedal device includes: a pedal pad that is deformable in a depressing direction of the pedal pad when an operator depresses the pedal pad; and a displacement amount sensor device that is configured to sense a displacement amount of the pedal pad and output a signal, which corresponds to the displacement amount of the pedal pad.

In the pedal device of the present disclosure, the pedal pad, which is depressed by the operator, is deformable in the depressing direction of the pedal pad, and the displacement amount sensor device is configured to sense a displacement amount of the pedal pad and output a signal, which corresponds to the displacement amount of the pedal pad. In this way, the pedal device of the present disclosure can provide the operation amount of the pedal device, which is operated by the operator, based on the displacement amount at the time of depressing the pedal pad relative to a state (hereinafter, referred to as an initial state) of the pedal pad at the time when the operator does not depress the pedal pad. When the operator removes the foot from the pedal pad, the pedal pad returns to the initial state. Therefore, it is possible to limit occurrence of that the operation amount at the pedal device becomes an unintended value due to, for example, catching of the pedal pad by the floor mat. Thus, the pedal device of the present disclosure can reliably sense the operation amount of the pedal device that is operated by the operator.

Various embodiments of the present disclosure will be described with reference to the drawings. In the following embodiments, substantially identical parts are indicated by the same reference signs and will not be described redundantly for the sake of simplicity.

First Embodiment

Figure 1:
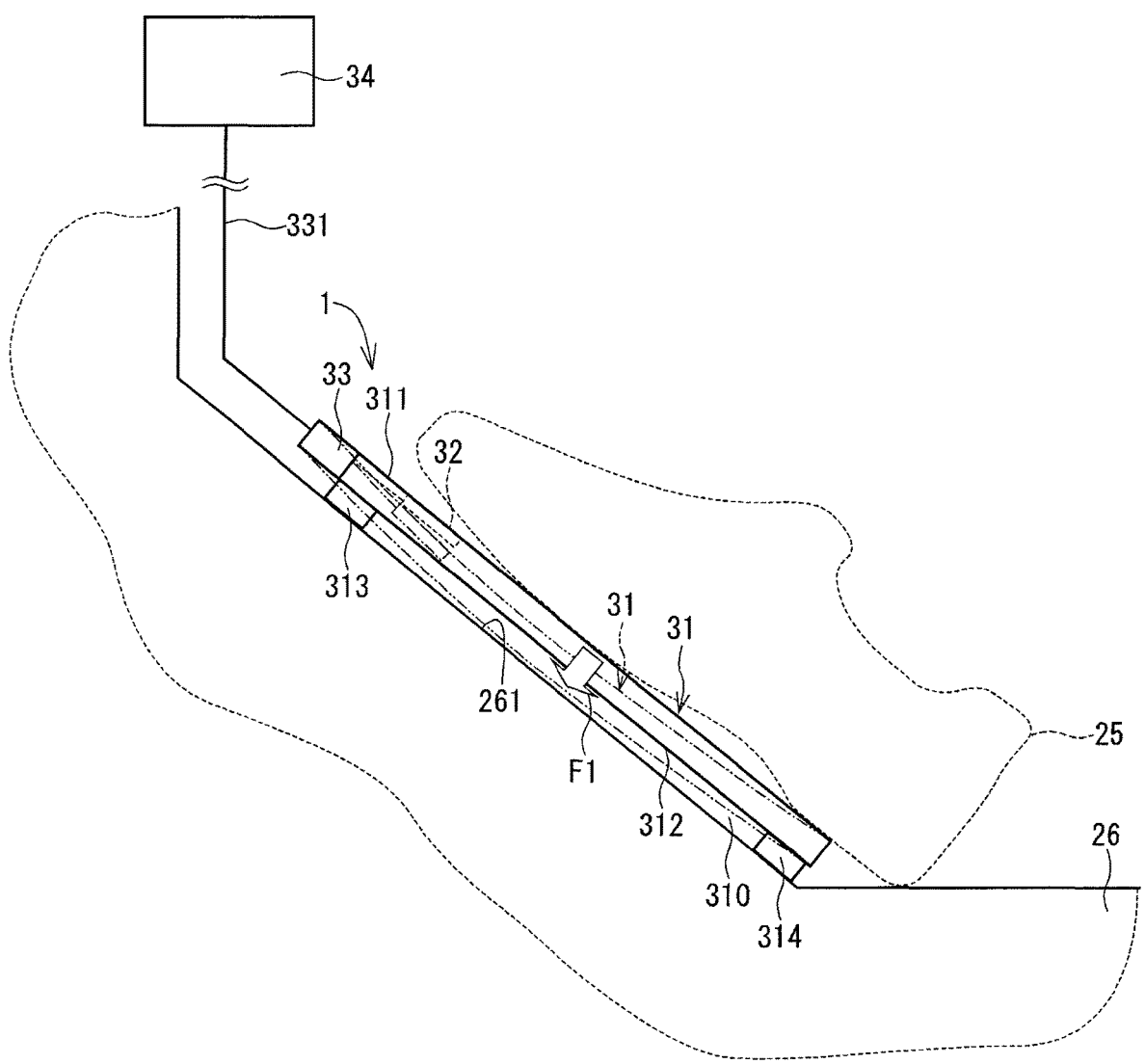
FIG. 1 is a schematic diagram of an accelerator device according to a first embodiment of the present disclosure.

FIG. 1 shows a pedal device according to a first embodiment of the present disclosure. The accelerator device 1, which serves as a pedal device, is an input device that is operated by a driver who serves as an operator of a vehicle to determine a valve opening degree of a throttle valve of a vehicle engine (not shown). The accelerator device 1 is an electronic type and transmits an electric signal, which indicates a depression amount of a pedal pad 31 serving as an operation amount of the pedal pad 31, to an electronic control device (not shown). The electronic control device drives the throttle valve through a throttle actuator (not shown) based on the depression amount and the other information.

The accelerator device 1 includes the pedal pad 31, a strain gauge (serving as a displacement amount sensor device) 32, a connector 33 and a processor 34. In an inside of a cabin (not shown) of the vehicle, which is provided with the accelerator device 1, the accelerator device 1 is installed at a location where the driver can easily depress the accelerator device 1 with a foot 25 of the driver. The accelerator device 1 is supported by a vehicle body (serving as a base) 26. Hereinafter, in FIG. 1, a toe side of the driver's foot 25 along an inner wall surface 261 of the vehicle body 26 will be referred to as an upper side, and a heel side of the driver's foot 25 along the inner wall surface 261 of the vehicle body 26 is referred to as "lower side."

The pedal pad 31 is a member shaped in a planar plate form and is made of a flexible material. The pedal pad 31 includes: a front surface 311 that is configured to contact the drivers foot 25 and serves as "a side that is configured to contact the operator's foot"; and a back surface 312 that is opposite from the front surface 311 and serves as "an opposite side that is opposite from the side, which is configured to contact the operators foot." Spacers 313, 314, which can form a gap 310 between the back surface 312 and the inner wall surface 261, are installed to the back surface 312. The pedal pad 31 is deformable in a direction of a blank arrow F1 (serving as a depressing direction) when the driver depresses the pedal pad 31 (see the pedal pad 31 indicated by a dot-dot-dash line in FIG. 1).

The strain gauge 32 is installed to the front surface 311 side of the pedal pad 31 at the upper side of the pedal pad 31. The strain gauge 32 senses the displacement amount of the pedal pad 31 and outputs an electric signal, which corresponds to the displacement amount, to the connector 33.

The connector 33 is placed at the upper side of the pedal pad 31. The connector 33 outputs the electric signal, which is outputted from the strain gauge 32, to the processor 34 through a cable 331.

The processor 34 is installed in, for example, an engine control unit, which serves as an external electronic control device. The processor 34 computes the displacement amount of the pedal pad 31 based on the electric signal, which is outputted from the strain gauge 32 through the connector 33. The processor 34 computes the depression amount of the pedal pad 31, which is depressed by the driver, based on the computed displacement amount. The electronic control device converts the computed depression amount to a signal to be outputted to the outside, and this signal is outputted from the electronic control device to an electronic throttle that is located at the outside and adjusts an amount of intake air. Thereby, the opening degree of the electronic throttle is controlled.

Next, an operation of the accelerator device 1 will be described.

In the accelerator device 1, when the driver depresses the pedal pad 31, the pedal pad 31 is deformed in the direction of the blank arrow F1. The strain gauge 32 senses the displacement amount of the pedal pad 31 and transmits the electric signal, which corresponds to the displacement amount, to the electronic control device through the connector 33. The electronic control device controls the drive operation of the throttle valve based on the received electric signal.

(a) The accelerator device 1 of the first embodiment includes the pedal pad 31 that is deformed in the depressing direction when the driver depresses the pedal pad 31. At the accelerator device 1, this displacement amount is sensed with the strain gauge 32, and the depression amount of the pedal pad 31, which is depressed by the driver, is computed. When the depression of the pedal pad 31 by the driver is released, the deformed pedal pad 31 returns to its initial state. When the pedal pad 31 returns to the initial state, the displacement amount of the pedal pad 31, which is sensed with the strain gauge 32, becomes zero (0). Therefore, the processor 34 determines that the depression amount of the pedal pad 31 is zero (0). Thereby, it is possible to limit occurrence of that the depression amount of the pedal pad becomes an unintended value due to, for example, catching of the pedal pad by a floor mat that is likely to occur in a case of the accelerator device, in which the pedal pad is configured to rotate about a shaft. As a result, the accelerator device 1 can reliably sense the depression amount of the pedal pad.

Second Embodiment

Next, a pedal device according to a second embodiment of the present disclosure will be described with reference to FIG. 2. The second embodiment differs from the first embodiment with respect to the number of strain gauges.

Figure 2:
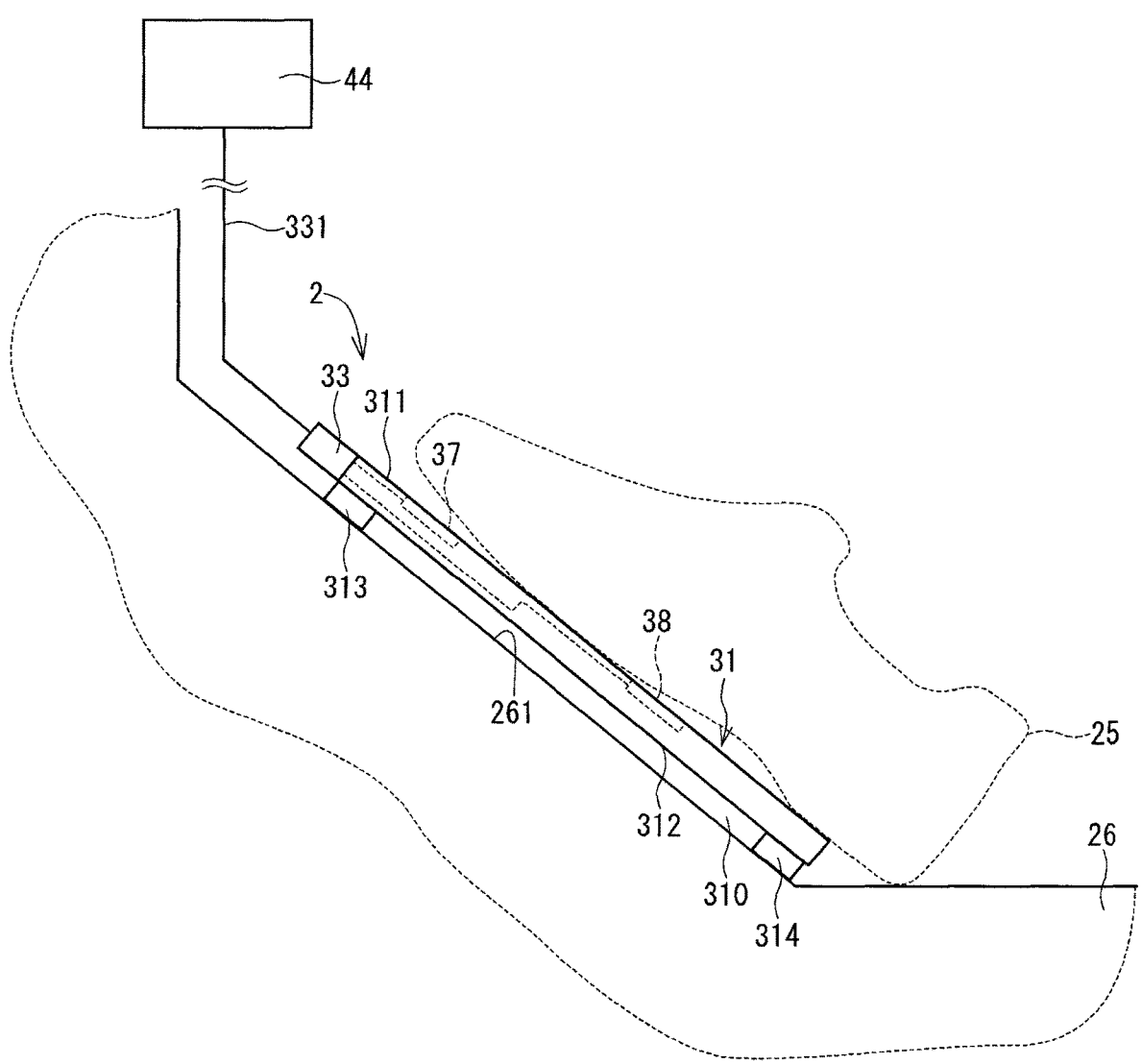
FIG. 2 is a schematic diagram of an accelerator device according to a second embodiment of the present disclosure.

FIG. 2 shows the accelerator device 2, which serves as the pedal device, according to the second embodiment of the present disclosure. The accelerator device 2 includes the pedal pad 31, strain gauges (serving as displacement amount sensor devices) 37, 38, the connector 33 and a processor 44.

The strain gauges 37, 38 are installed to a front surface 311 side of the pedal pad 31. The strain gauge 37 is placed at the upper side of the pedal pad 31. The strain gauge 38 is placed at the lower side of the pedal pad 31. Each of the strain gauges 37, 38 senses the displacement amount of the pedal pad 31 at the installed location of the strain gauge 37, 38 and outputs the electric signal, which correspond to the sensed displacement amount, to the connector 33. Specifically, in the second embodiment, the two electric signals are outputted toward the processor 44.

The processor 44 computes the displacement amount of the pedal pad 31 based on the two electric signals, which are outputted from the connector 33. At this time, the processor 44 sets a maximum value among the two displacement amounts, which are computed based on the two electric signals, as the displacement amount of the pedal pad 31. The processor 44 computes the depression amount of the pedal pad 31, which is depressed by the driver, based on the maximum value of the two computed displacement amounts. The computed depression amount is transmitted to the electronic control device.

The accelerator device 2 of the second embodiment provides the advantage (a) of the first embodiment.

(b) In the accelerator device 2 of the second embodiment, the maximum value of the displacement amounts of the pedal pad 31 at the installed locations of the two strain gauges 37, 38 is set as the displacement amount of the pedal pad 31. In this way, when one of the two strain gauges 37, 38 is deformed, the deformation of the pedal pad 31 can be sensed, and based on the amount of this deformation, the depression amount of the pedal pad 31, which is depressed by the driver, can be computed. Furthermore, even in a case where the deformation of the pedal pad 31 cannot be sensed with the one strain gauge due to the way of applying the depressing force of the driver to the pedal pad 31, the deformation of the pedal pad 31 can be sensed with the other strain gauge. In this way, the sensing accuracy of the depression amount of the pedal pad 31 can be improved.

Third Embodiment

Next, a pedal device according to a third embodiment of the present disclosure will be described with reference to FIG. 3. The third embodiment differs from the first embodiment with respect to an installed location of the strain gauge.

Figure 3:
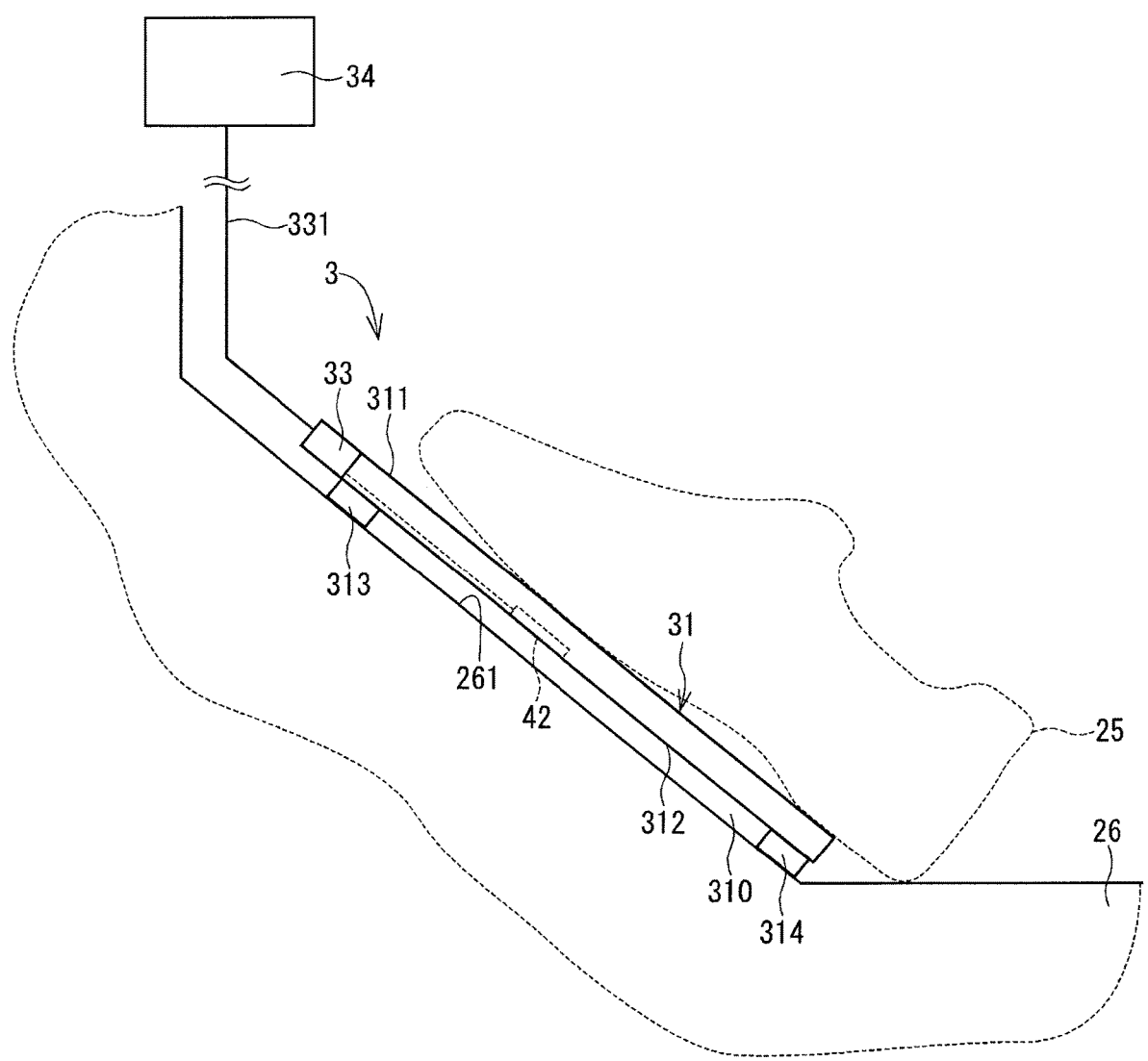
FIG. 3 is a schematic diagram of an accelerator device according to a third embodiment of the present disclosure.

FIG. 3 shows the accelerator device 3, which serves as the pedal device, according to the third embodiment of the present disclosure. The accelerator device 3 includes the pedal pad 31, a strain gauge (serving as a displacement amount sensor device) 42, the connector 33 and the processor 34.

The strain gauge 42 is installed to the back surface 312 side of the pedal pad 31 generally at the center of the pedal pad 31. The strain gauge 42 senses the displacement amount of the pedal pad 31 and outputs an electric signal, which corresponds to the displacement amount, to the connector 33.

The accelerator device 3 of the third embodiment provides the advantage (a) of the first embodiment.

(c) In the accelerator device 3 of the third embodiment, the strain gauge 42 is installed to the back surface 312 side of the pedal pad 31, so that the strain gauge 42 does not contact the driver's foot 25. Thereby, a sensing error, which may possibly be generated through contact between the strain gauge and the foot 25, can be reduced to zero (0). Thus, the sensing accuracy of the depression amount of the pedal pad 31 can be further improved.

(d) Furthermore, since the strain gauge 42 does not contact the driver's foot 25, the location of the strain gauge 42 at the back surface 312 can be freely selected. In this way, the strain gauge can be generally positioned at the center of the pedal pad 31 where the displacement amount is maximum like in the case of the accelerator device 2. Thus, a small difference in the depression amount of the pedal pad 31 can be sensed, and thereby the sensing accuracy of the depression amount of the pedal pad 31 can be further improved.

Fourth Embodiment

Next, a pedal device according to a fourth embodiment of the present disclosure will be described with reference to FIG. 4. The fourth embodiment differs from the third embodiment with respect to the number of strain gauges.

Figure 4:
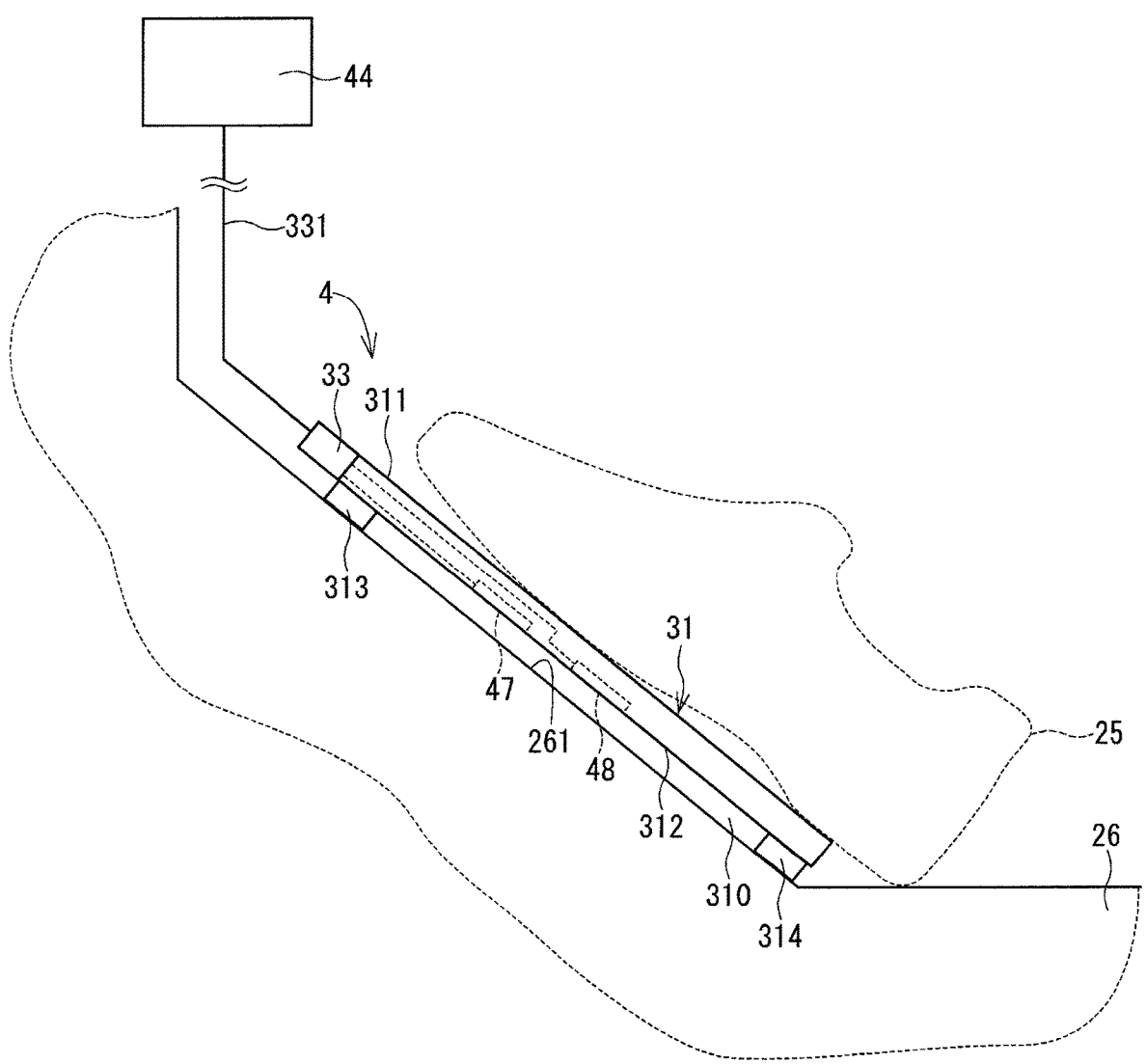
FIG. 4 is a schematic diagram of an accelerator device according to a fourth embodiment of the present disclosure.

FIG. 4 shows the accelerator device 4, which serves as the pedal device, according to the fourth embodiment of the present disclosure. The accelerator device 4 includes the pedal pad 31, the strain gauges (serving as displacement amount sensor devices) 47, 48, the connector 33 and the processor 44.

The strain gauges 47, 48 are installed to the back surface 312 side of the pedal pad 31. The strain gauge 47 is placed at the upper side of the pedal pad 31. The strain gauge 48 is placed at the lower side of the pedal pad 31. Each of the strain gauges 47, 48 senses the displacement amount of the pedal pad 31 at the installed location of the strain gauge 47, 48 and outputs the electric signal, which correspond to the sensed displacement amount, to the connector 33. Specifically, in the fourth embodiment, the two electric signals are outputted toward the processor 44.

The accelerator device 4 of the fourth embodiment provides the advantage (a) of the first embodiment, the advantage (b) of the second embodiment, and the advantage (c) of the third embodiment.

Furthermore, in a case where one of the strain gauges 47, 48 is generally positioned at the center of the pedal pad 31, the advantage (d) of the third embodiment can be achieved.

Fifth Embodiment

Next, a pedal device according to a fifth embodiment of the present disclosure will be described with reference to FIG. 5. The fifth embodiment differs from the first embodiment with respect to the shape of the pedal pad.

Figure 5:
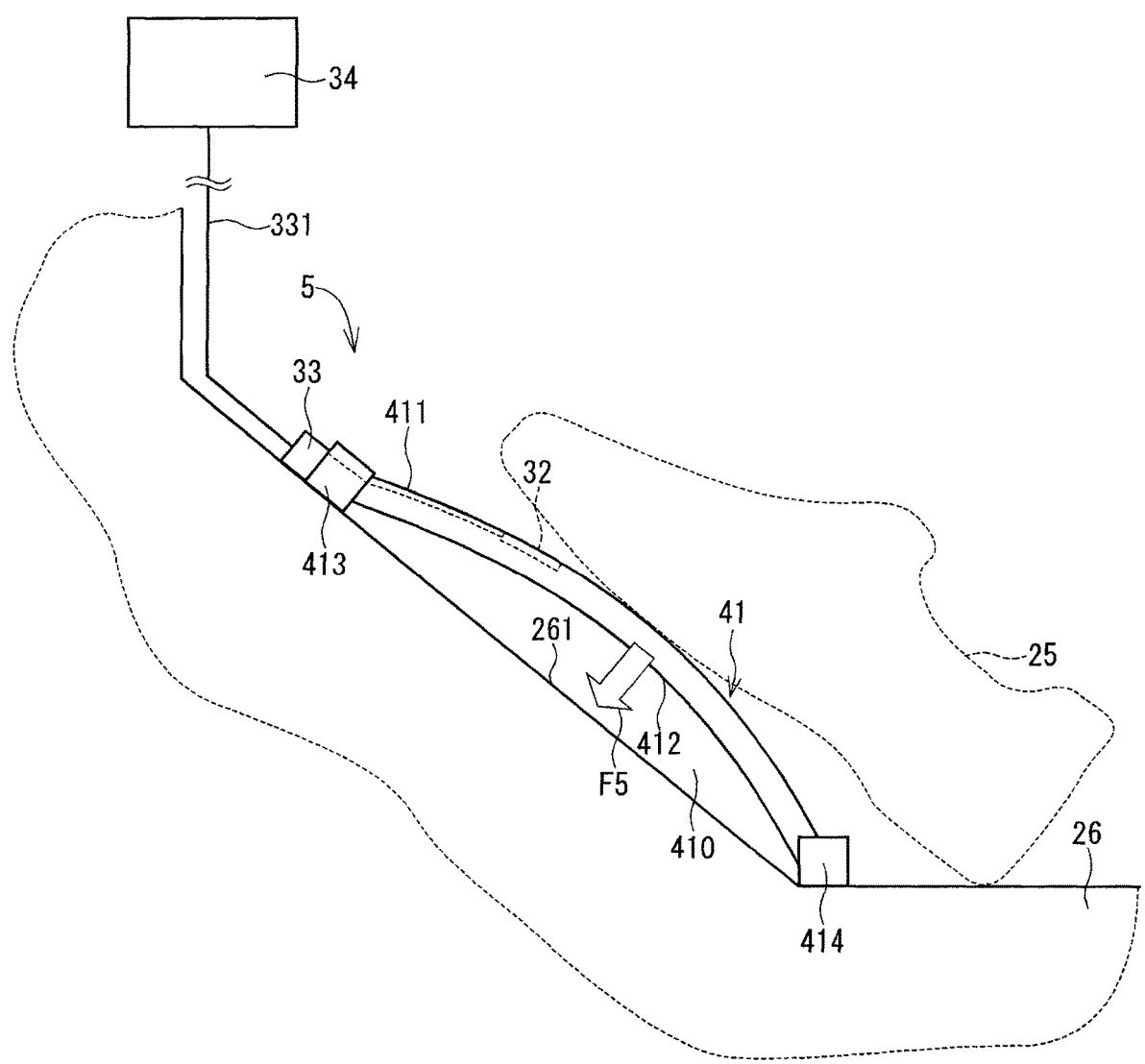
FIG. 5 is a schematic diagram of an accelerator device according to a fifth embodiment of the present disclosure.

FIG. 5 shows the accelerator device 5, which serves as the pedal device, according to the fifth embodiment of the present disclosure. The accelerator device 5 includes a pedal pad 41, the strain gauge 32, the connector 33 and the processor 34.

The pedal pad 41 is made of a flexible material. The pedal pad 41 is shaped into a curved form that projects in a direction away from the inner wall surface 261 of the vehicle body 26, at which the pedal pad 41 is installed.

The pedal pad 41 includes: a front surface 411 that is configured to contact the drivers foot 25 and serves as "a side that is configured to contact the operator's foot"; and a back surface 412 that is opposite from the front surface 411 and serves as "an opposite side that is opposite from the side, which is configured to contact the operator's foot." Fixation end parts 413, 414, which fix the pedal pad 41 to the vehicle body 26, are provided at an upper end part and a lower end part, respectively, of the pedal pad 41. The pedal pad 41 is deformable in a direction of a blank arrow F5 (serving as a depressing direction) when the driver depresses the pedal pad 41.

The strain gauge 32 is installed to the front surface 411 of the pedal pad 41 at the upper side of the pedal pad 41.

The connector 33 is placed at the upper side of the pedal pad 41.

The accelerator device 5 of the fifth embodiment provides the advantage (a) of the first embodiment.

(e) Furthermore, in the accelerator device 5 of the fifth embodiment, since the pedal pad 41 is formed to project in the direction away from the inner wall surface 261 of the vehicle body 26, a gap 410 between the back surface 412 and the inner wall surface 261 is larger than the gap 310 of the first embodiment. Thus, the displacement amount of the pedal pad 41 in the direction of the blank arrow F5 is increased, and thereby the driver can easy adjust the depression amount of the pedal pad 41. As a result, the operability can be improved.

Sixth Embodiment

Next, a pedal device according to a sixth embodiment of the present disclosure will be described with reference to FIG. 6. The sixth embodiment differs from the fifth embodiment with respect to an installed location of the strain gauge.

Figure 6:
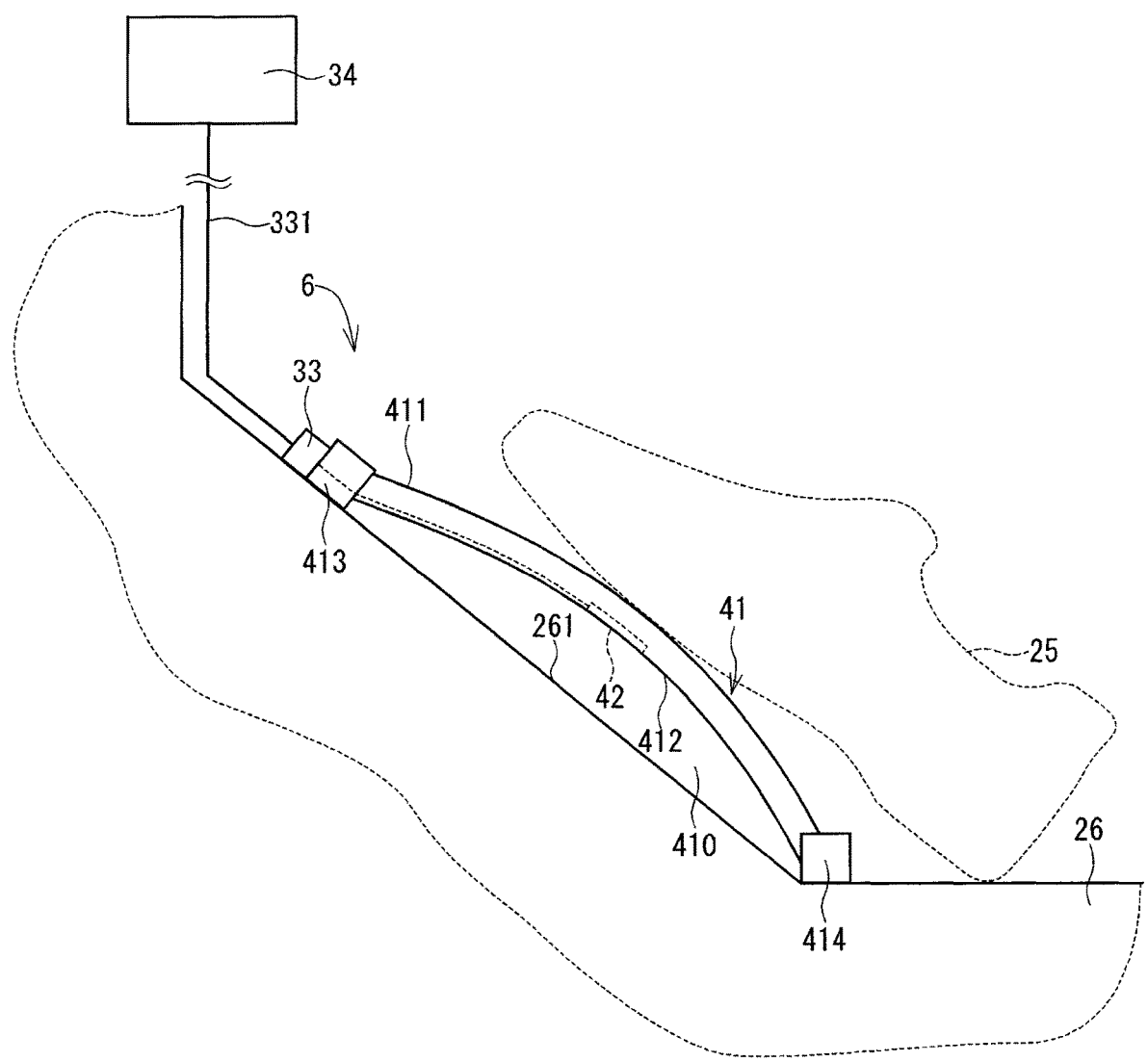
FIG. 6 is a schematic diagram of an accelerator device according to a sixth embodiment of the present disclosure.

FIG. 6 shows the accelerator device 6, which serves as the pedal device, according to the sixth embodiment of the present disclosure. The accelerator device 6 includes the pedal pad 41, the strain gauge 42, the connector 33 and the processor 34.

The strain gauge 42 is installed to the back surface 412 side of the pedal pad 41 at generally the center of the pedal pad 41. The strain gauge 42 senses the displacement amount of the pedal pad 41 and outputs an electric signal, which corresponds to the displacement amount, to the connector 33.

The accelerator device 6 of the sixth embodiment provides the advantage (a) of the first embodiment, the advantages (c), (d) of the third embodiment, and the advantage (e) of the fifth embodiment.

Seventh Embodiment

Next, a pedal device according to a seventh embodiment of the present disclosure will be described with reference to FIG. 7. The seventh embodiment differs from the fifth embodiment with respect to movement of the pedal pad relative to the vehicle body.

Figure 7:
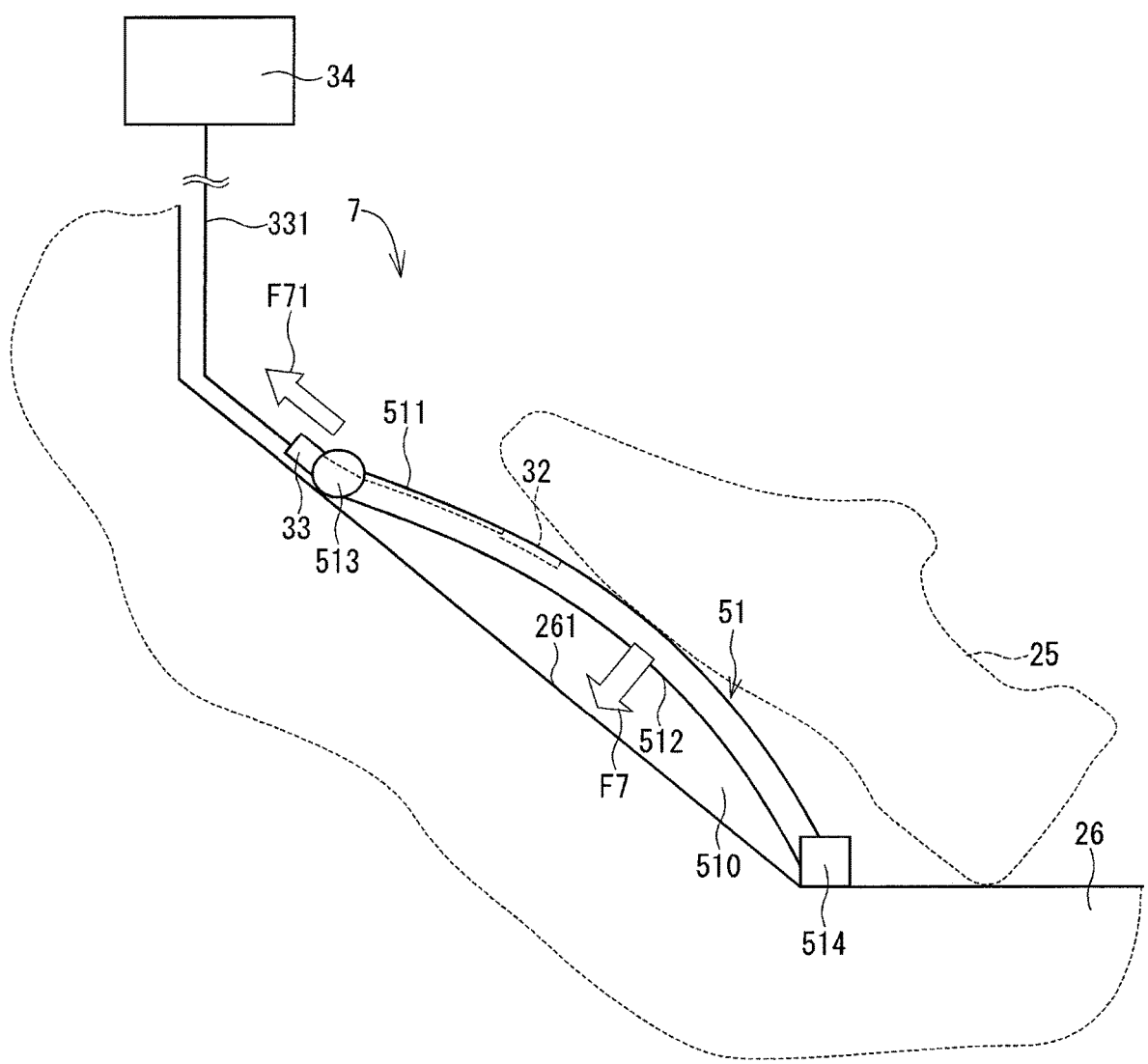
FIG. 7 is a schematic diagram of an accelerator device according to a seventh embodiment of the present disclosure.

FIG. 7 shows the accelerator device 7, which serves as the pedal device, according to the seventh embodiment of the present disclosure. The accelerator device 7 includes the pedal pad 51, the strain gauge 32, the connector 33 and the processor 34.

The pedal pad 51 is made of the flexible material. The pedal pad 51 is shaped into a curved form that projects in the direction away from the inner wall surface 261 of the vehicle body 26, at which the pedal pad 51 is installed.

The pedal pad 51 includes: a front surface 511 that is configured to contact the drivers foot 25 and serves as "a side that is configured to contact the operator's foot"; and a back surface 512 that is opposite from the front surface 511 and serves as "an opposite side that is opposite from the side, which is configured to contact the operator's foot." A gap 510 is formed between the back surface 512 and the inner wall surface 261. A free end part 513 is provided at an upper end part of the pedal pad 51. The free end part 513 is movable along the inner wall surface 261 of the vehicle body 26 and serves as "one of at least two end parts of the pedal pad." A fixation end part 514, which is fixed to the vehicle body 26, is provided to a lower end part of the pedal pad 51. The pedal pad 51 is deformable in a direction of a blank arrow F7 (serving as a depressing direction) when the driver depresses the pedal pad 51.

The strain gauge 32 is installed to the front surface 511 side of the pedal pad 51 at the upper side of the pedal pad 51.

The connector 33 is placed at the upper side of the pedal pad 51.

The accelerator device 7 of the seventh embodiment provides the advantage (a) of the first embodiment, and the advantage (e) of the fifth embodiment.

(f) Furthermore, in the accelerator device 7 of the seventh embodiment, when the driver depresses the pedal pad 51, the pedal pad 51 is deformed in the direction of the blank arrow F7. At this time, the free end part 513 of the pedal pad 51 is moved in a direction of a blank arrow F71 along the inner wall surface 261, so that the displacement amount of the pedal pad 51 in the direction of the blank arrow F7 is increased. Thus, the driver can more easily adjust the depression amount. As a result, the operability can be further improved.

Eighth Embodiment

Next, a pedal device according to an eighth embodiment of the present disclosure will be described with reference to FIG. 8. The eighth embodiment differs from the seventh embodiment with respect to an installed location of the strain gauge.

Figure 8:
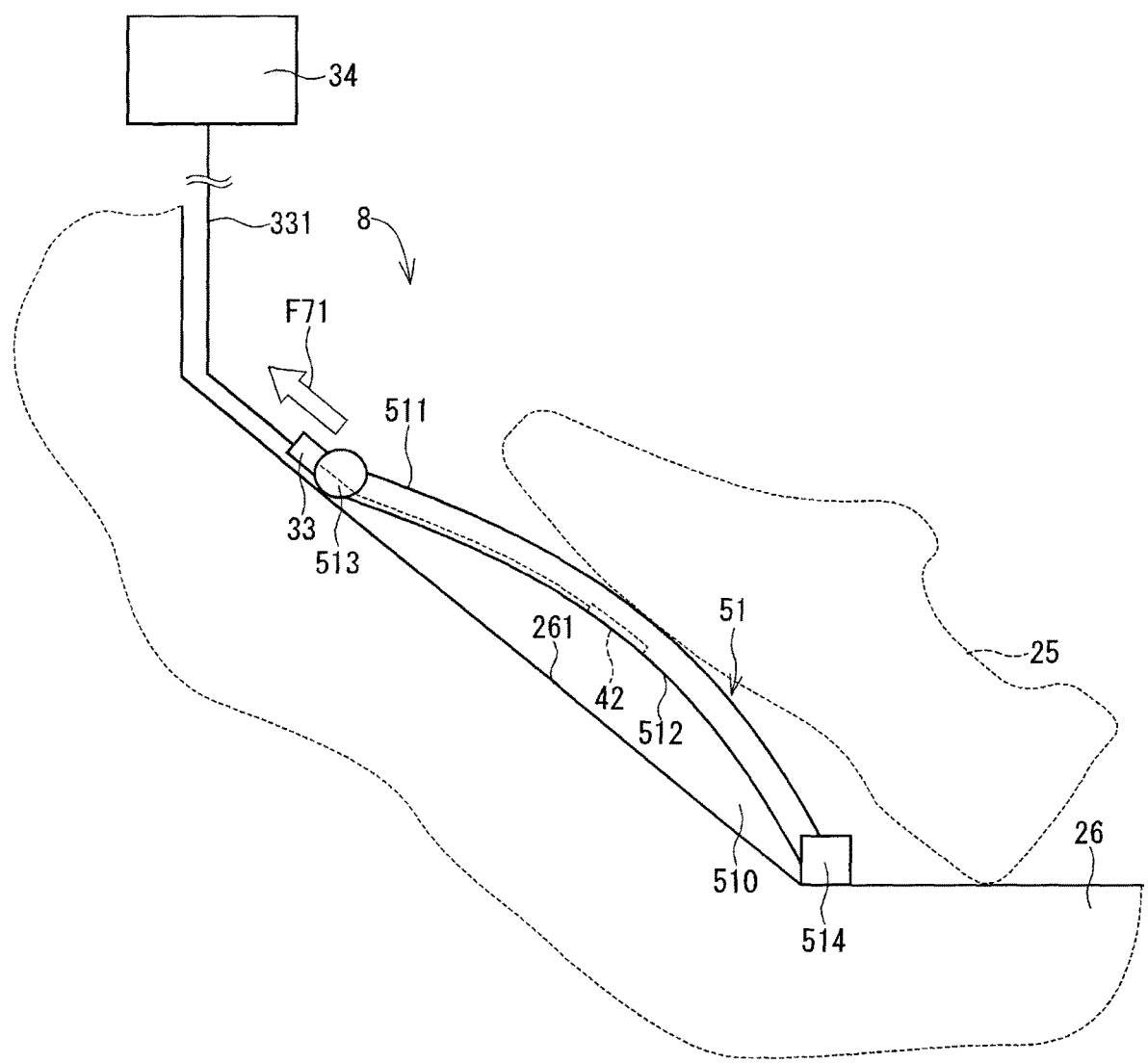
FIG. 8 is a schematic diagram of an accelerator device according to an eighth embodiment of the present disclosure.

FIG. 8 shows the accelerator device 8, which serves as the pedal device, according to the eighth embodiment of the present disclosure. The accelerator device 8 includes the pedal pad 51, the strain gauge 42, the connector 33 and the processor 34.

The strain gauge 42 is installed to the back surface 512 side of the pedal pad 51 at generally the center of the pedal pad 51. The strain gauge 42 senses the displacement amount of the pedal pad 51 and outputs an electric signal, which corresponds to the displacement amount, to the connector 33.

The accelerator device 8 of the eighth embodiment provides the advantage (a) of the first embodiment, the advantages (c), (d) of the third embodiment, the advantage (e) of the fifth embodiment, and the advantage (f) of the seventh embodiment.

Ninth Embodiment

Next, a pedal device according to an ninth embodiment of the present disclosure will be described with reference to FIG. 9. The ninth embodiment differs from the fifth embodiment with respect to movement of the pedal pad relative to the vehicle body.

Figure 9:
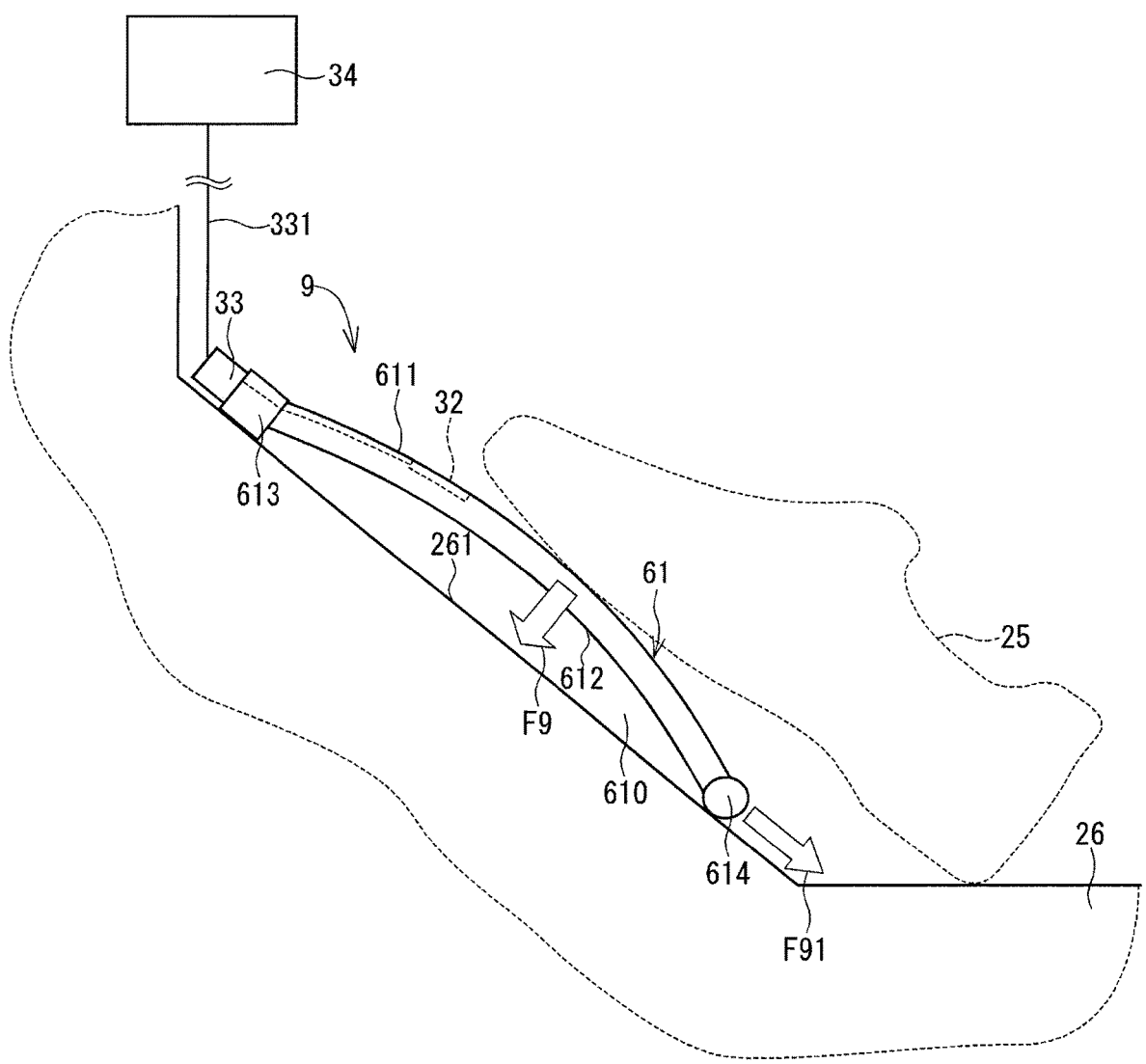
FIG. 9 is a schematic diagram of an accelerator device according to a ninth embodiment of the present disclosure.

FIG. 9 shows the accelerator device 9, which serves as the pedal device, according to the ninth embodiment of the present disclosure. The accelerator device 9 includes a pedal pad 61, the strain gauge 32, the connector 33 and the processor 34.

The pedal pad 61 is made of the flexible material. The pedal pad 61 is shaped into a curved form that projects in the direction away from the inner wall surface 261 of the vehicle body 26, at which the pedal pad 61 is installed.

The pedal pad 61 includes: a front surface 611 that is configured to contact the driver's foot 25 and serves as "a side that is configured to contact the operator's foot"; and a back surface 612 that is opposite from the front surface 611 and serves as "an opposite side that is opposite from the side, which is configured to contact the operator's foot." A gap 610 is formed between the back surface 612 and the inner wall surface 261. A fixation end part 613, which fixes the pedal pad 61 to the vehicle body 26, is provided to an upper end part of the pedal pad 61. A free end part 614 is provided at a lower end part of the pedal pad 61. The free end part 614 is movable in a direction of a blank arrow F91 along the inner wall surface 261 of the vehicle body 26 and serves as "one of at least two end parts of the pedal pad." The pedal pad 61 is deformable in a direction of a blank arrow F9 (serving as a depressing direction) when the driver depresses the pedal pad 61.

The strain gauge 32 is installed to the front surface 611 side of the pedal pad 61 at the upper side of the pedal pad 61.

The connector 33 is placed at the upper side of the pedal pad 61.

The accelerator device 9 of the ninth embodiment provides the advantage (a) of the first embodiment, and the advantage (e) of the fifth embodiment.

(g) Furthermore, in the accelerator device 9 of the ninth embodiment, when the driver depresses the pedal pad 61, the pedal pad 61 is deformed in the direction of the blank arrow F9. At this time, the free end part 614 of the pedal pad 61 is moved in the direction of the blank arrow F91 along the inner wall surface 261, so that the displacement amount of the pedal pad 61 in the direction of the blank arrow F9 is increased. Thus, the driver can easily adjust the depression amount. As a result, the operability can be further improved.

Tenth Embodiment

Next, a pedal device according to a tenth embodiment of the present disclosure will be described with reference to FIG. 10. The tenth embodiment differs from the ninth embodiment with respect to an installed location of the strain gauge.

Figure 10:
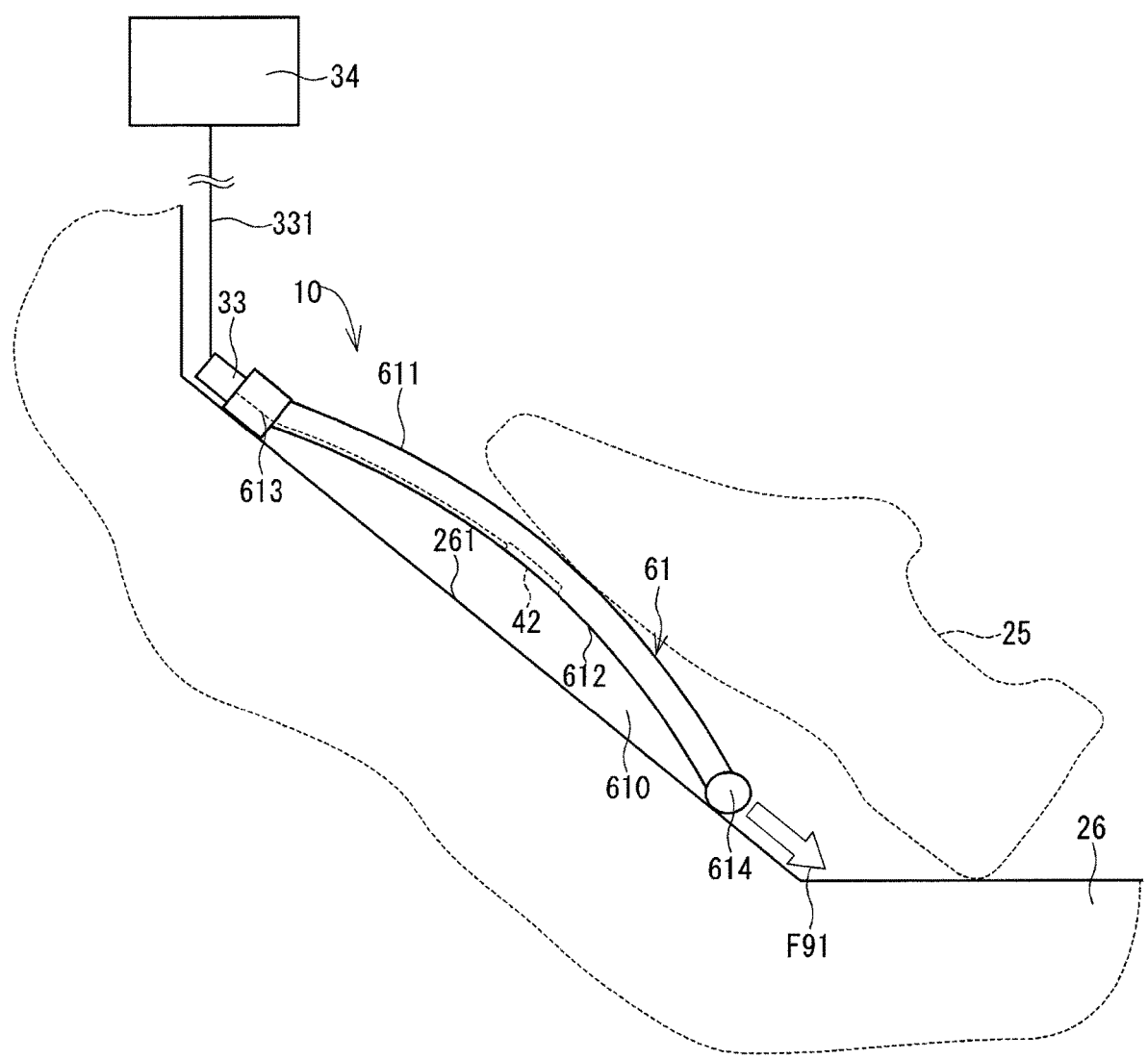
FIG. 10 is a schematic diagram of an accelerator device according to a tenth embodiment of the present disclosure.

FIG. 10 shows the accelerator device 10, which serves as the pedal device, according to the tenth embodiment of the present disclosure. The accelerator device 10 includes the pedal pad 61, the strain gauge 42, the connector 33 and the processor 34.

The strain gauge 42 is installed to the back surface 612 side of the pedal pad 61 at generally the center of the pedal pad 61. The strain gauge 42 senses the displacement amount of the pedal pad 61 and outputs an electric signal, which corresponds to the displacement amount, to the connector 33.

The accelerator device 10 of the tenth embodiment provides the advantage (a) of the first embodiment, the advantages (c), (d) of the third embodiment, the advantage (e) of the fifth embodiment, and the advantage (g) of the ninth embodiment.

Eleventh Embodiment

Figure 11:
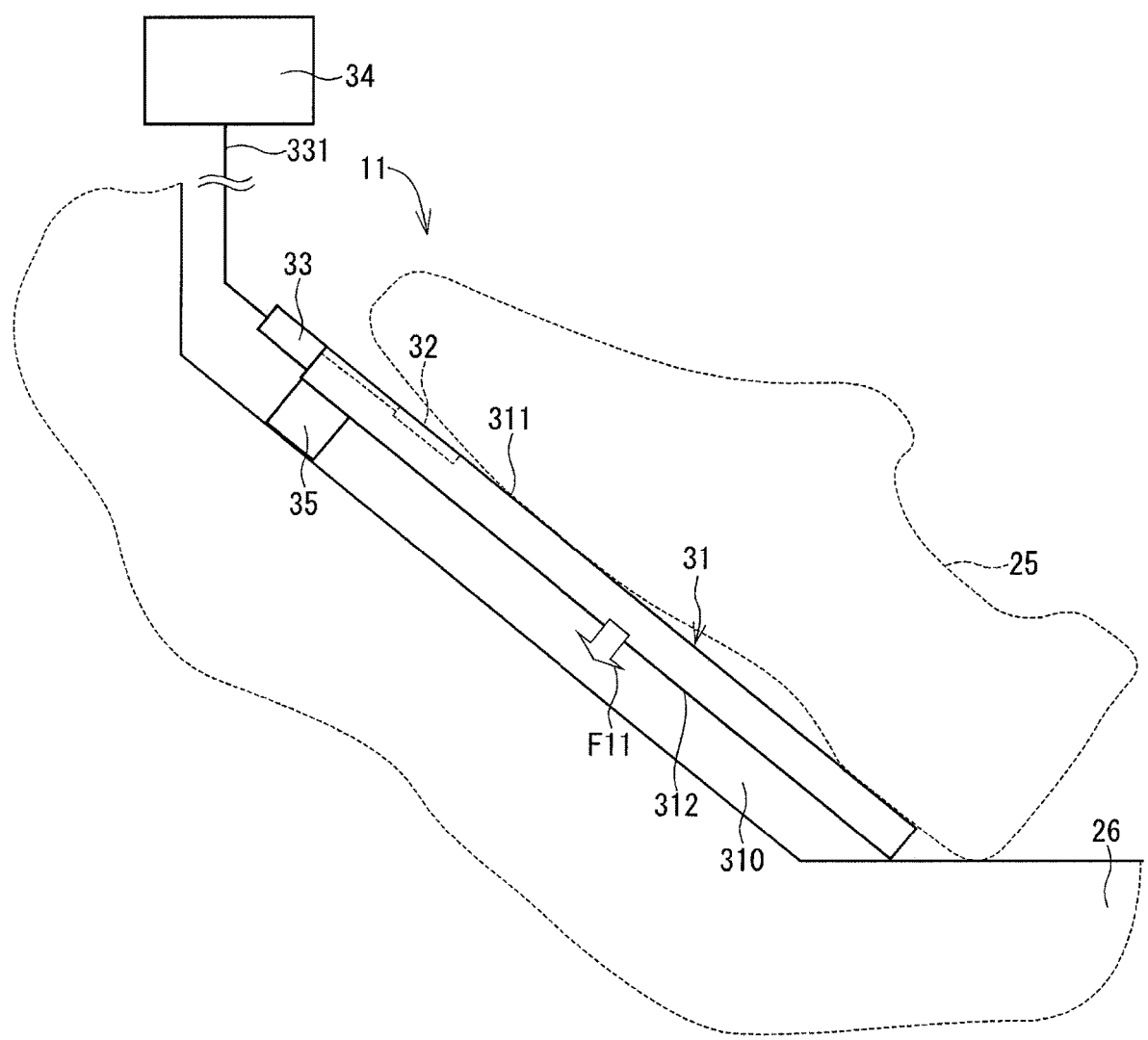
FIG. 11 is a schematic diagram of an accelerator device according to an eleventh embodiment of the present disclosure.

Next, a pedal device according to an eleventh embodiment of the present disclosure will be described with reference to FIG. 11. The eleventh embodiment differs from the first embodiment with respect to provision of an urethane member.

The accelerator device 11, which serves as the pedal device, according to the eleventh embodiment of the present disclosure includes the pedal pad 31, the strain gauge 32, the connector 33, the processor 34 and a urethane member 35.

The urethane member 35 is installed between the pedal pad 31 and the vehicle body 26 at the upper side of the pedal pad 31 in place of the spacer 313. The urethane member 35 is a member that is expandable and contractible in a direction of a blank arrow F11, which serves as "a depressing direction", in response to the depressing operation of the pedal pad 31 by the driver.

The accelerator device 11 of the eleventh embodiment provides the advantage (a) of the first embodiment.

(h) Furthermore, in the accelerator device 11 of the eleventh embodiment, when the driver depresses the pedal pad 31, the urethane member 35 is compressed, thereby increasing the displacement amount of the pedal pad 31 in the direction of the blank arrow F11. Thus, the driver can easily adjust the depression amount. As a result, the operability can be improved.

Twelfth Embodiment

Next, a pedal device according to a twelfth embodiment of the present disclosure will be described with reference to FIG. 12. The twelfth embodiment differs from the eleventh embodiment with respect to an installed location of the strain gauge.

Figure 12:
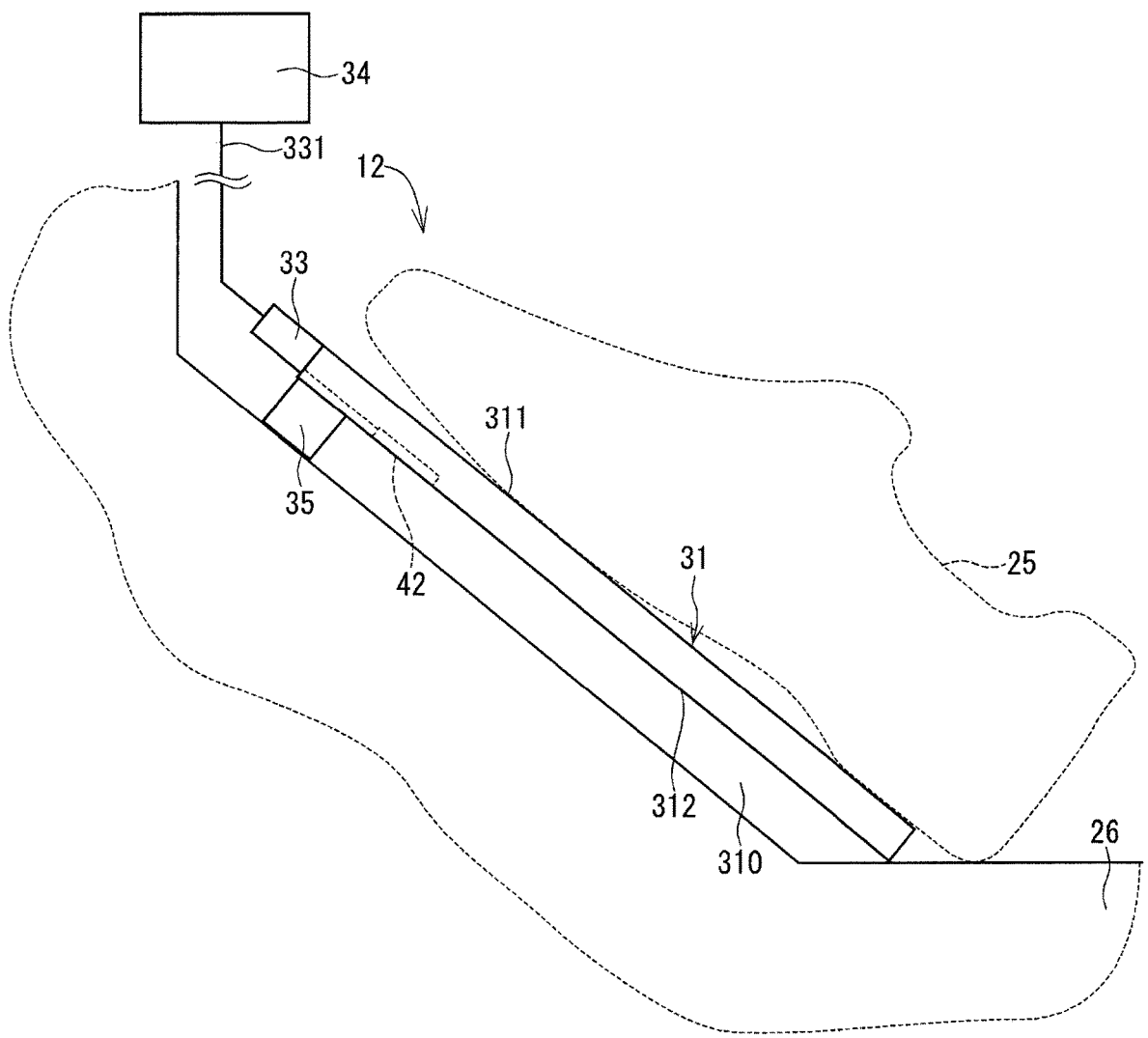
FIG. 12 is a schematic diagram of an accelerator device according to a twelfth embodiment of the present disclosure.

FIG. 12 shows the accelerator device 12, which serves as the pedal device, according to the twelfth embodiment of the present disclosure. The accelerator device 12 includes: the pedal pad 31; the strain gauge 42 installed to the back surface 312 side of the pedal pad 31; the connector 33; the processor 34; and the urethane member 35. Thereby, the accelerator device 12 of the twelfth embodiment provides the advantage (a) of the first embodiment, the advantages (c), (d) of the third embodiment, and the advantage (h) of the eleventh embodiment.

Thirteenth Embodiment

Figure 13:
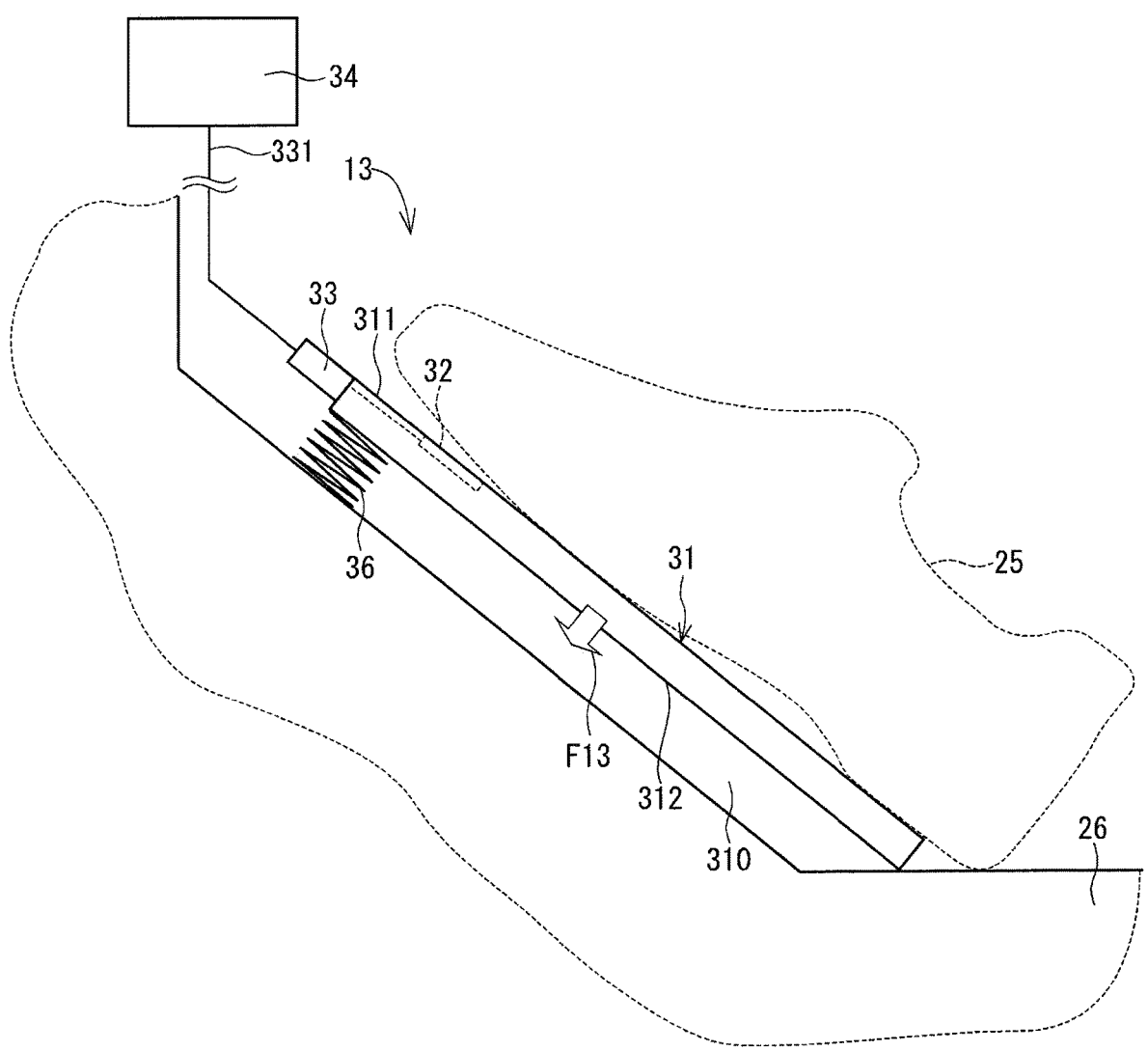
FIG. 13 is a schematic diagram of an accelerator device according to a thirteenth embodiment of the present disclosure.

Next, a pedal device according to a thirteenth embodiment of the present disclosure will be described with reference to FIG. 13. The thirteenth embodiment differs from the first embodiment with respect to provision of an spring.

The accelerator device 13, which serves as the pedal device, according to the thirteenth embodiment of the present disclosure includes the pedal pad 31, the strain gauge 32, the connector 33, the processor 34 and a spring 36, which serves as "an expandable and contractible member."

The spring 36 is installed between the pedal pad 31 and the vehicle body 26 at the upper side of the pedal pad 31 in place of the spacer 313. The spring 36 is a member that is expandable and contractible in a direction of a blank arrow F13, which serves as "a depressing direction", in response to the depressing operation of the pedal pad 31 by the driver.

The accelerator device 13 of the thirteenth embodiment provides the advantage (a) of the first embodiment.

(h) Furthermore, in the accelerator device 13 of the thirteenth embodiment, when the driver depresses the pedal pad 31, the spring 36 is compressed, thereby increasing the displacement amount of the pedal pad 31 in the direction of the blank arrow F13. Thus, the driver can easily adjust the depression amount. As a result, the operability can be further improved.

Fourteenth Embodiment

Next, a pedal device according to a fourteenth embodiment of the present disclosure will be described with reference to FIG. 14. The fourteenth embodiment differs from the thirteenth embodiment with respect to an installed location of the strain gauge.

Figure 14:
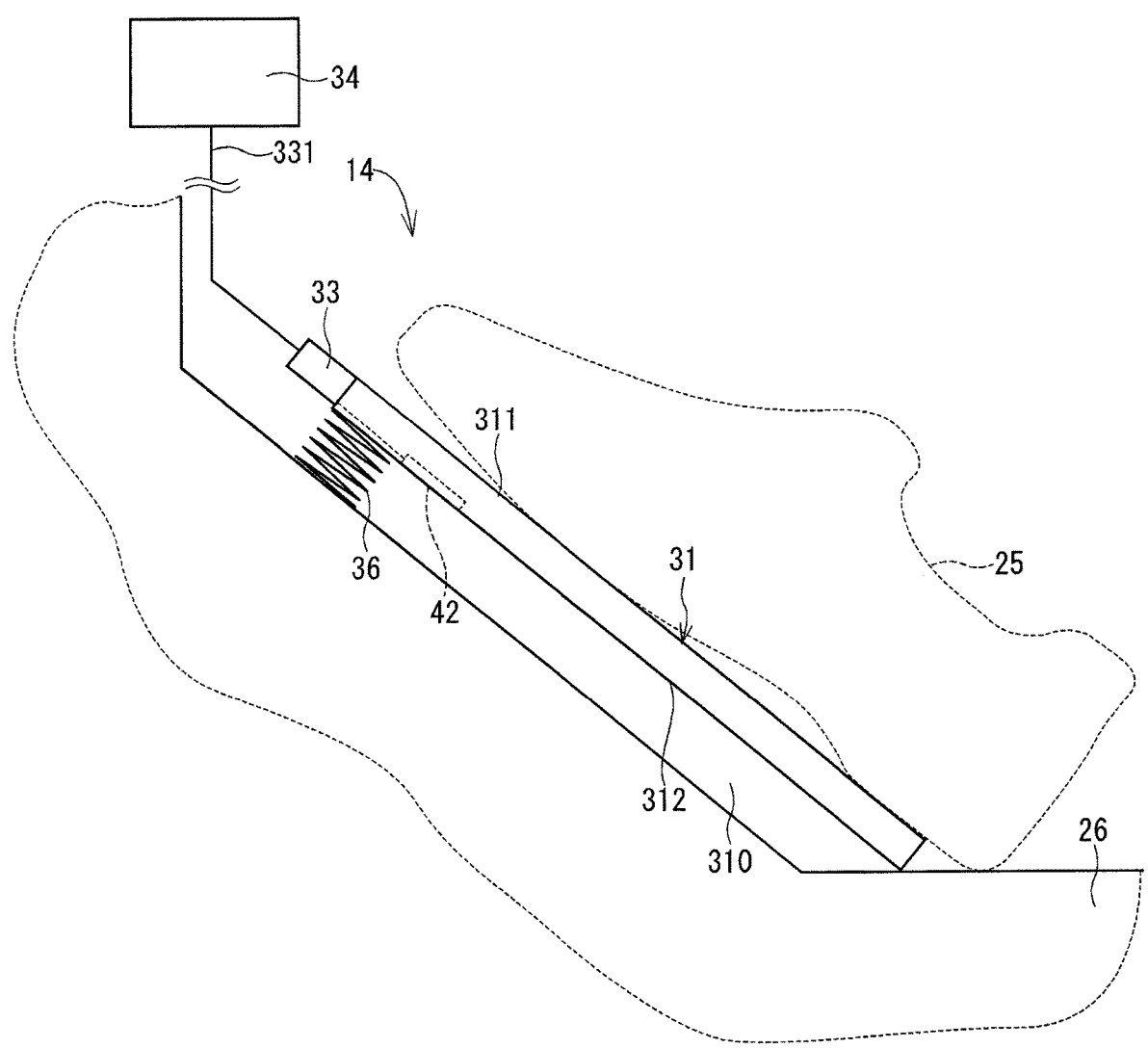
FIG. 14 is a schematic diagram of an accelerator device according to a fourteenth embodiment of the present disclosure.

FIG. 14 shows the accelerator device 14, which serves as the pedal device, according to the fourteenth embodiment of the present disclosure. The accelerator device 14 includes: the pedal pad 31; the strain gauge 42 installed to the back surface 312 side of the pedal pad 31; the connector 33; the processor 34; and the spring 36. Thereby, the accelerator device 14 of the fourteenth embodiment provides the advantage (a) of the first embodiment, the advantages (c), (d) of the third embodiment, and the advantage (i) of the thirteenth embodiment.

Fifteenth Embodiment

Next, a pedal device according to a fifteenth embodiment of the present disclosure will be described with reference to FIGS. 15 and 16. The fifteenth embodiment differs from the ninth embodiment with respect to provision of an urethane member.

Figure 15:
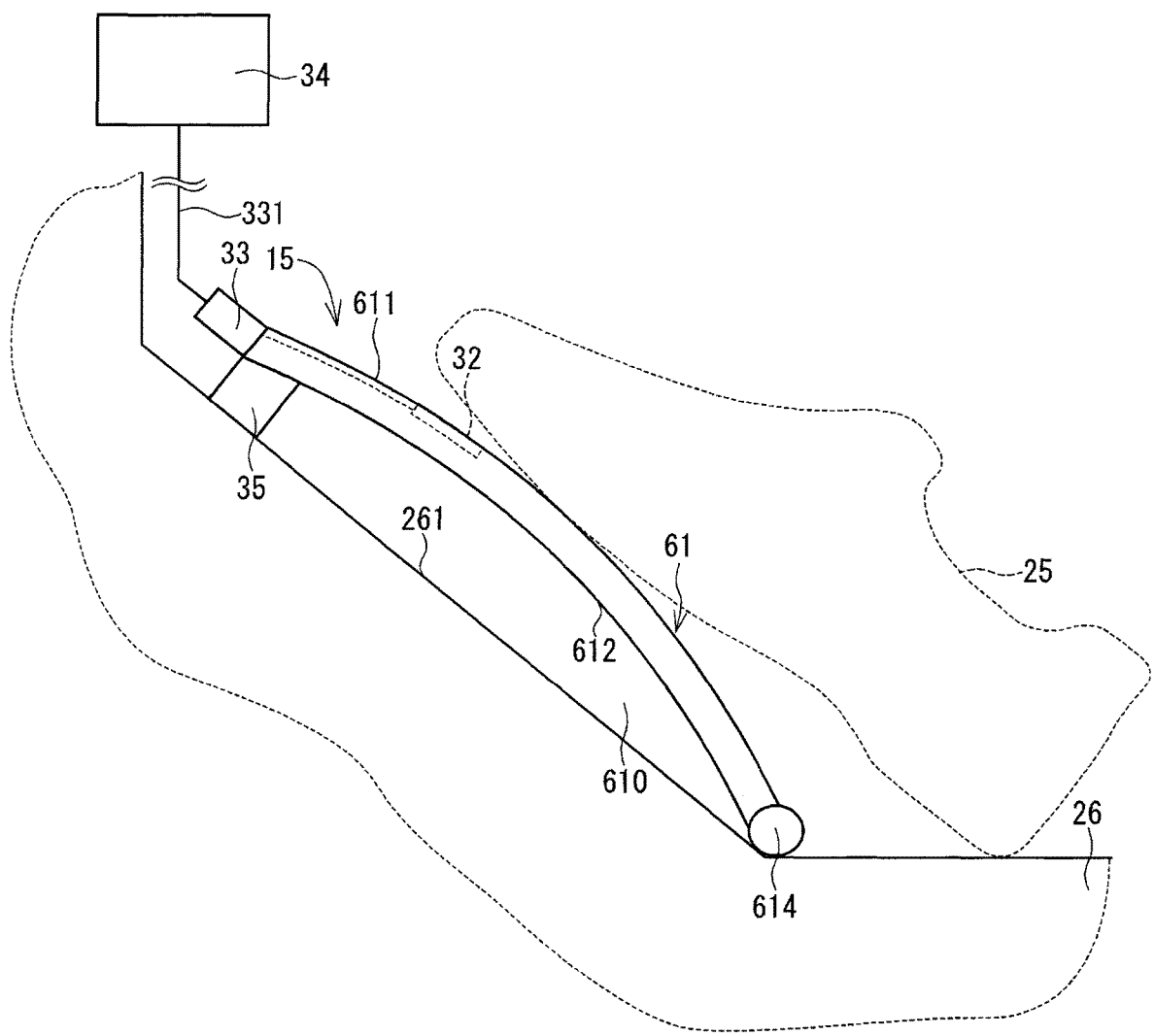
FIG. 15 is a schematic diagram of an accelerator device according to a fifteenth embodiment of the present disclosure.
Figure 16:
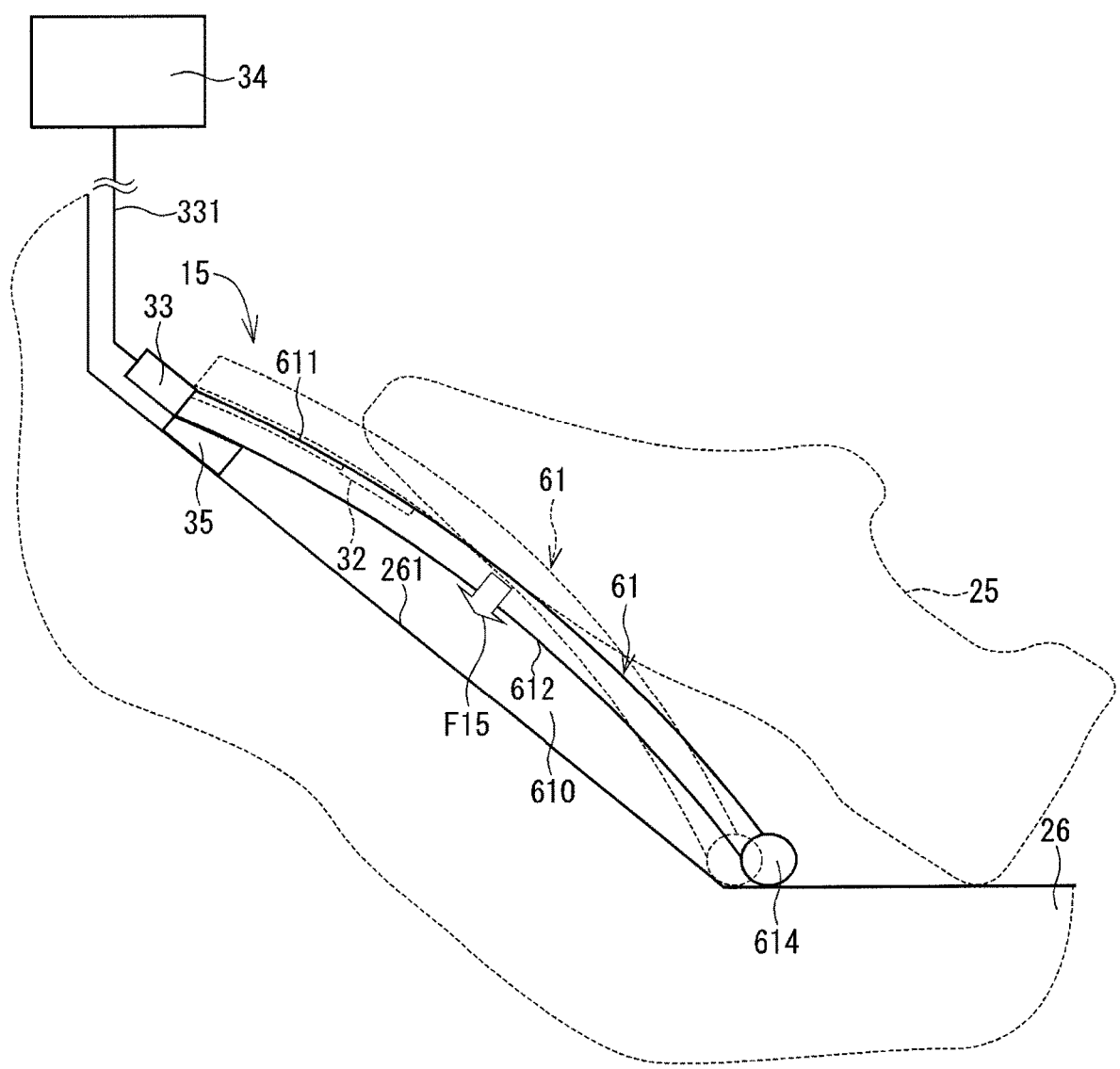
FIG. 16 is a schematic diagram showing a state of the accelerator device at a time of depressing a pedal pad from a state shown in FIG. 15.

FIGS. 15 and 16 show the accelerator device 15, which serves as the pedal device, according to the fifteenth embodiment of the present disclosure. The accelerator device 15 includes the pedal pad 61, the strain gauge 32, the connector 33, the processor 34 and the urethane member 35.

The accelerator device 15 of the fifteenth embodiment provides the advantage (a) of the first embodiment, the advantage (e) of the fifth embodiment, and the advantage (g) of the ninth embodiment.

(i) Furthermore, in the accelerator device 15 of the fifteenth embodiment, when the driver depresses the pedal pad 61, the pedal pad 61 is deformed in the direction of the blank arrow F15, and the urethane member 35 is compressed, as shown in FIG. 16. Thus, the displacement amount of the pedal pad 61 in a direction of a blank arrow F15 is increased in comparison to the ninth embodiment. Thus, the driver can more easily adjust the depression amount. As a result, the operability can be further improved.

Sixteenth Embodiment

Next, a pedal device according to a sixteenth embodiment of the present disclosure will be described with reference to FIG. 17. The sixteenth embodiment differs from the fifteenth embodiment with respect to an installed location of the strain gauge.

Figure 17:
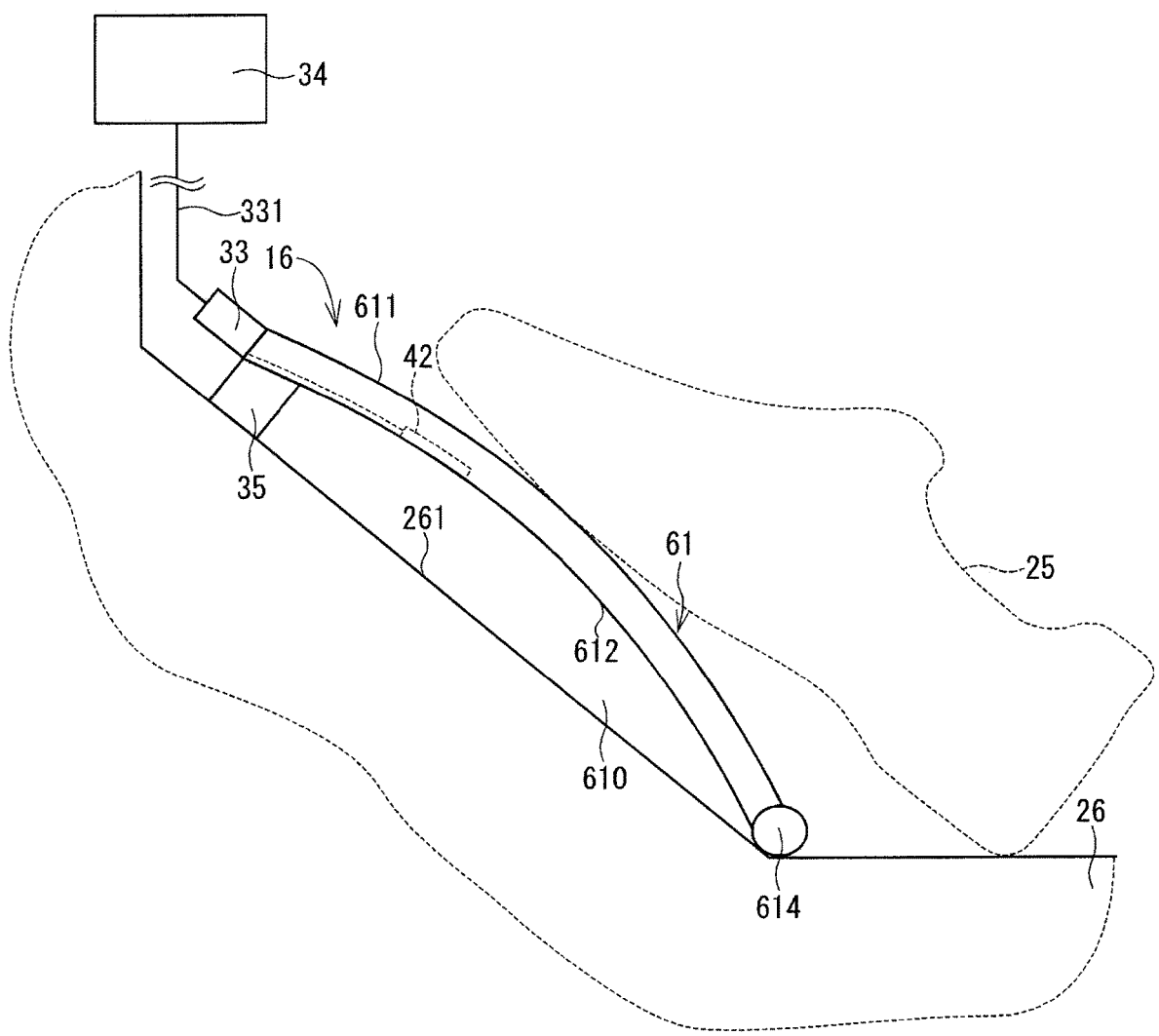
FIG. 17 is a schematic diagram of an accelerator device according to a sixteenth embodiment of the present disclosure.

FIG. 17 shows the accelerator device 16, which serves as the pedal device, according to the sixteenth embodiment of the present disclosure. The accelerator device 16 includes: the pedal pad 61; the strain gauge 42 installed to the back surface 612 side of the pedal pad 61; the connector 33; the processor 34; and the urethane member 35. Thereby, the accelerator device 16 of the sixteenth embodiment provides the advantage (a) of the first embodiment, the advantages (c), (d) of the third embodiment, the advantage (e) of the fifth embodiment, the advantage (g) of the ninth embodiment, and the advantage (j) of the fifteenth embodiment.

Seventeenth Embodiment

Next, a pedal device according to a seventeenth embodiment of the present disclosure will be described with reference to FIGS. 18 and 19. The seventeenth embodiment differs from the ninth embodiment with respect to provision of a spring.

Figure 18:
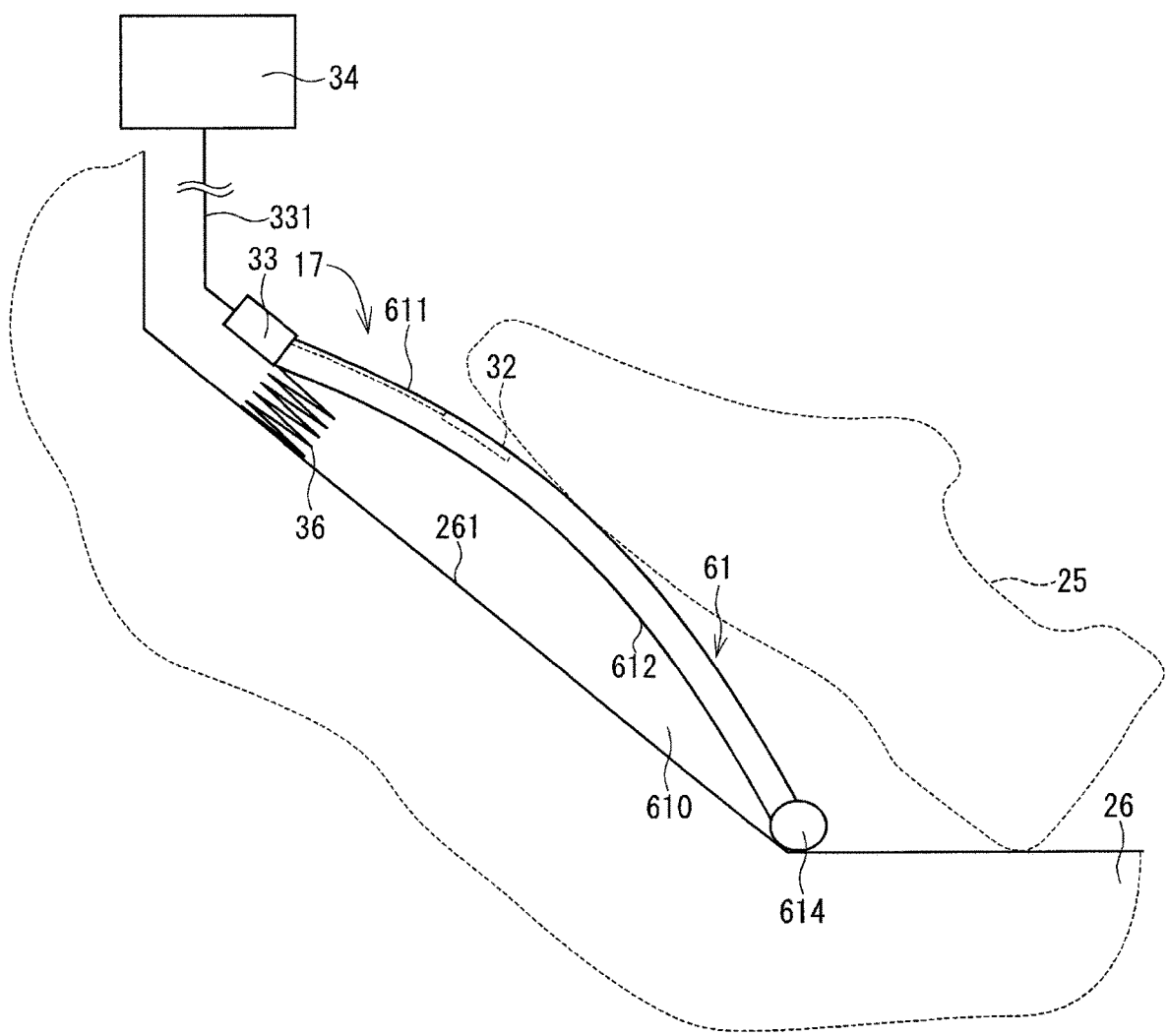
FIG. 18 is a schematic diagram of an accelerator device according to a seventeenth embodiment of the present disclosure.

FIG. 18 shows the accelerator device 17, which serves as the pedal device, according to the seventeenth embodiment of the present disclosure. The accelerator device 17 includes the pedal pad 61, the strain gauge 32, the connector 33, the processor 34 and the spring 36.

The accelerator device 17 of the seventeenth embodiment provides the advantage (a) of the first embodiment, the advantage (e) of the fifth embodiment, and the advantage (g) of the ninth embodiment.

Figure 19:
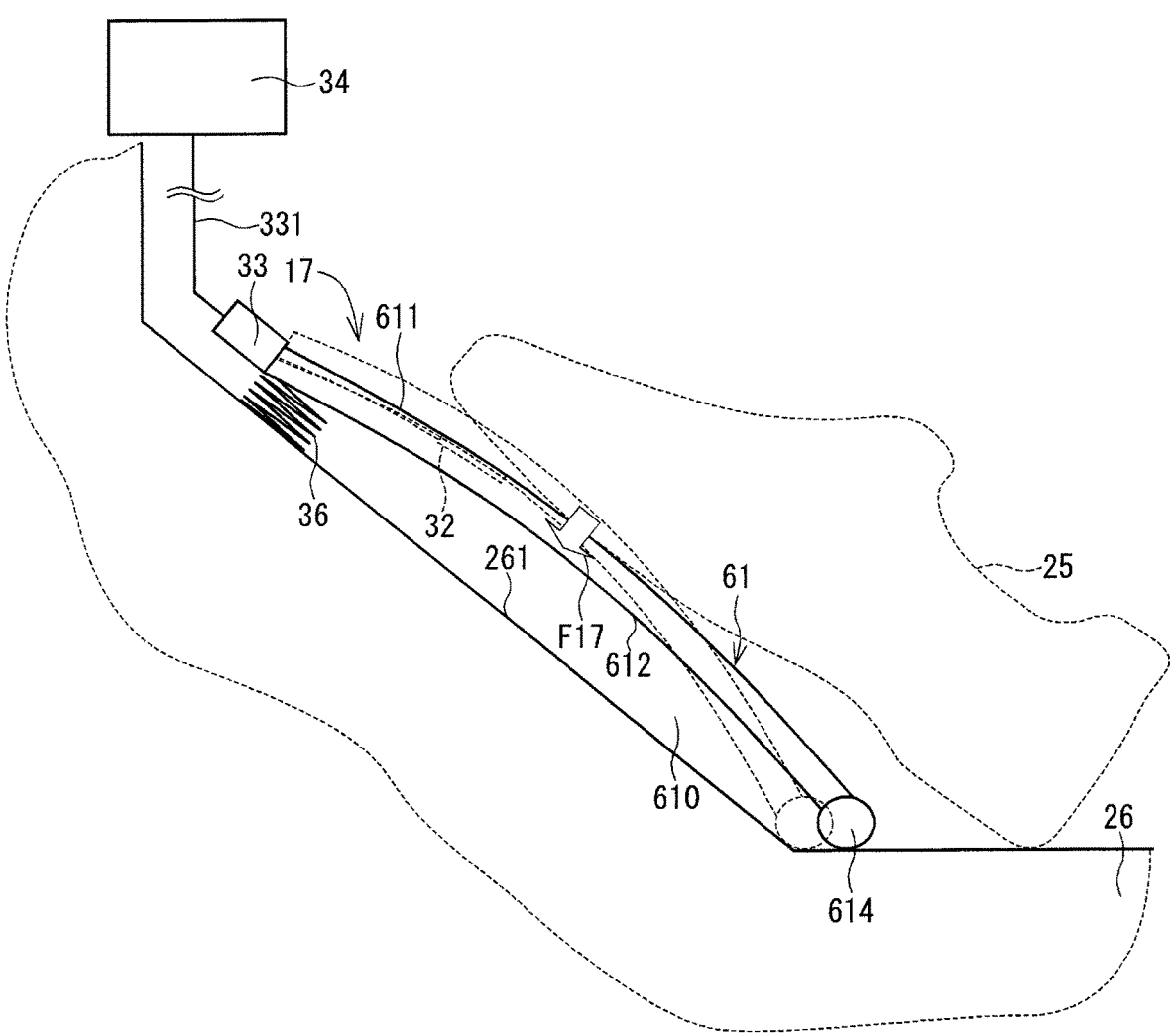
FIG. 19 is a schematic diagram showing a state of the accelerator device at a time of depressing a pedal pad from a state shown in FIG. 18.

(k) Furthermore, in the accelerator device 17 of the seventeenth embodiment, when the driver depresses the pedal pad 61, the pedal pad 61 is deformed in a direction of a blank arrow F17, and the spring 36 is compressed, as shown in FIG. 19. Thus, the displacement amount of the pedal pad 61 in the direction of the blank arrow F17 is increased in comparison to the ninth embodiment. Thus, the driver can more easily adjust the depression amount. As a result, the operability can be further improved.

Eighteenth Embodiment

Next, a pedal device according to an eighteenth embodiment of the present disclosure will be described with reference to FIG. 20. The eighteenth embodiment differs from the seventeenth embodiment with respect to an installed location of the strain gauge.

Figure 20:
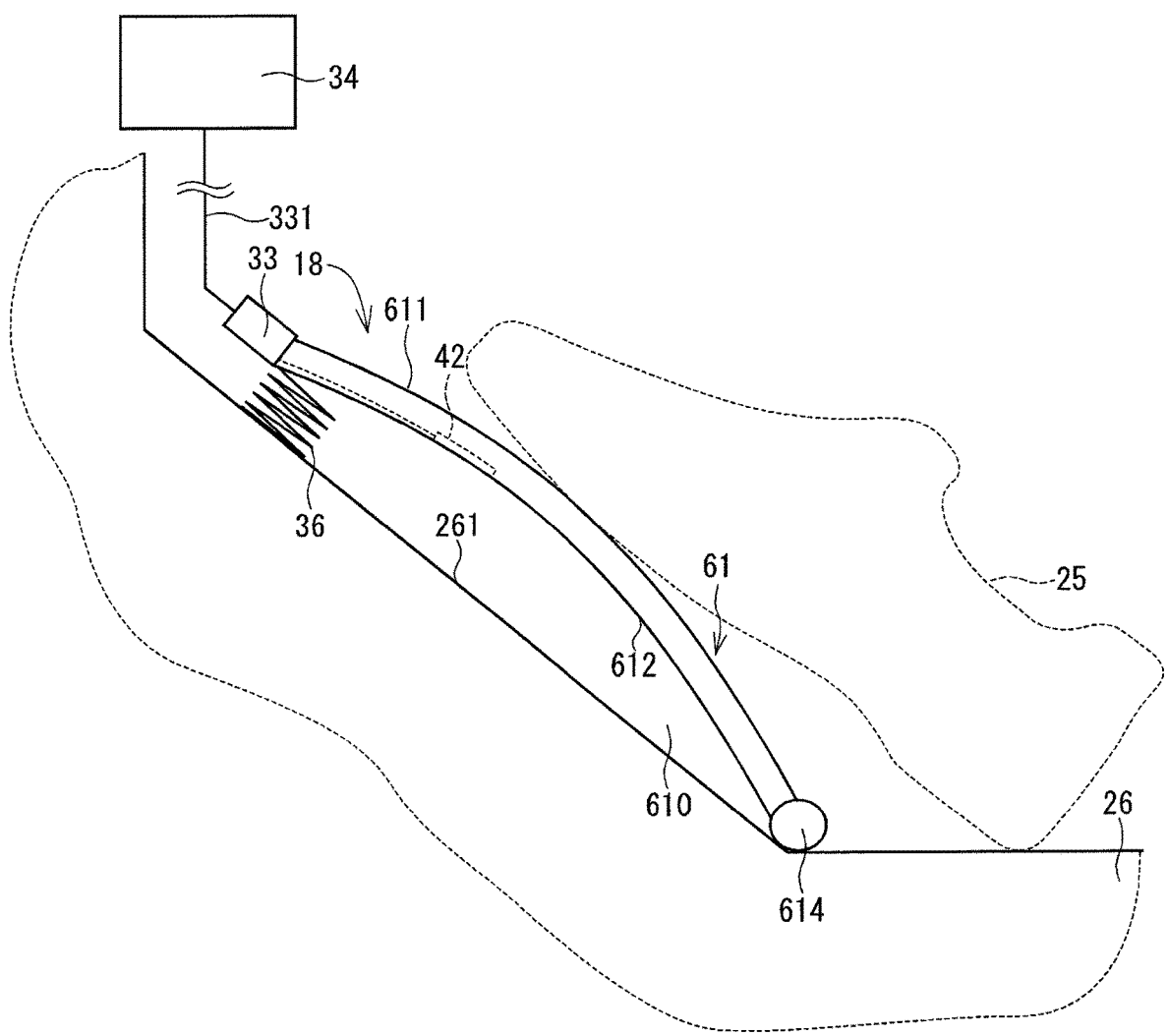
FIG. 20 is a schematic diagram of an accelerator device according to an eighteenth embodiment of the present disclosure.

FIG. 20 shows the accelerator device 18, which serves as the pedal device, according to the eighteenth embodiment of the present disclosure. The accelerator device 18 includes: the pedal pad 61; the strain gauge 42 installed to the back surface 612 side of the pedal pad 61; the connector 33; the processor 34; and the spring 36. Thereby, the accelerator device 18 of the eighteenth embodiment provides the advantage (a) of the first embodiment, the advantages (c), (d) of the third embodiment, the advantage (e) of the fifth embodiment, the advantage (g) of the ninth embodiment, and the advantage (k) of the seventeenth embodiment.

Nineteenth Embodiment

Next, a pedal device according to an nineteenth embodiment of the present disclosure will be described with reference to FIG. 21. The nineteenth embodiment differs from the first embodiment with respect to provision of a hysteresis mechanism.

Figure 21:
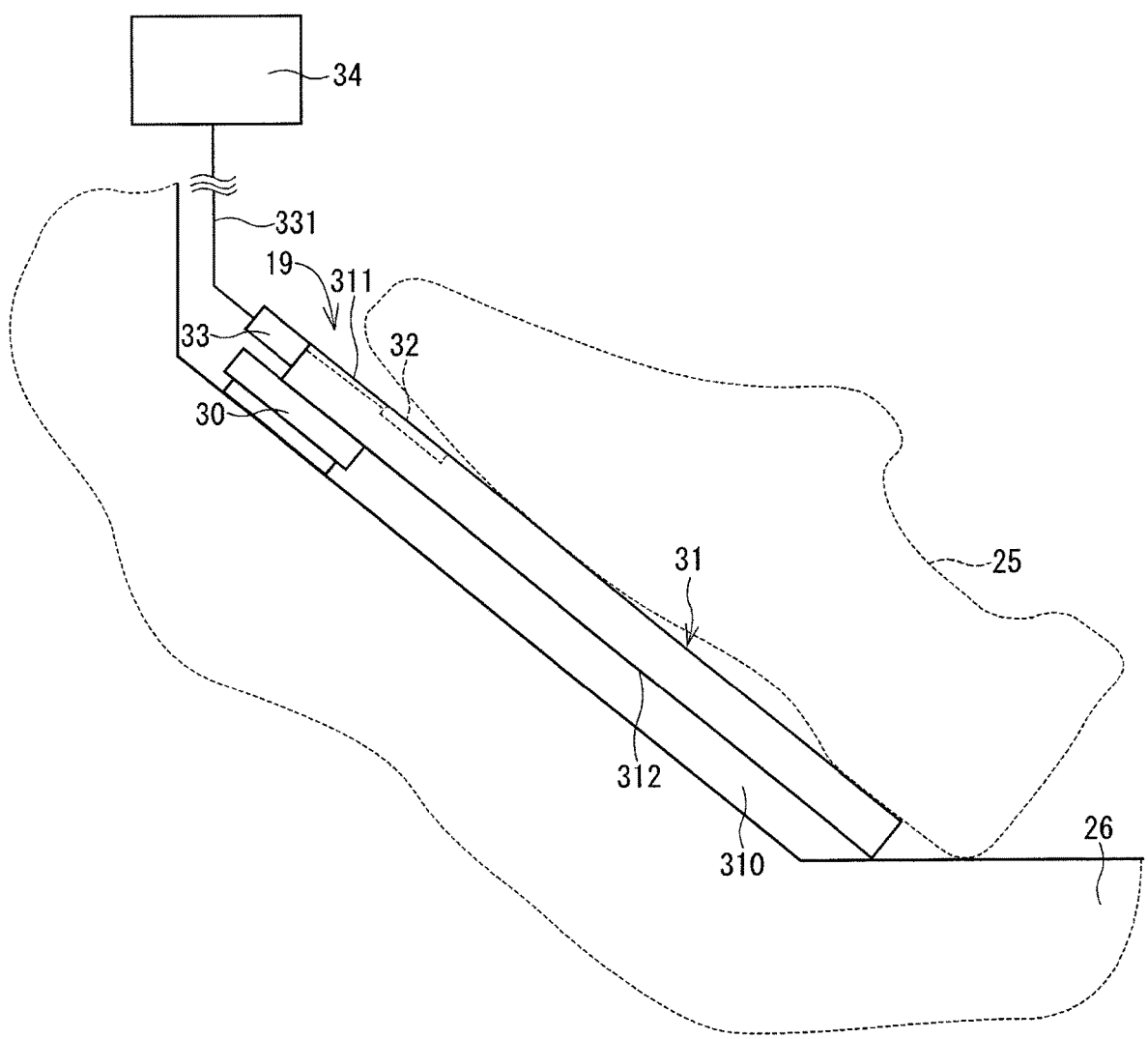
FIG. 21 is a schematic diagram of an accelerator device according to a nineteenth embodiment of the present disclosure.

FIG. 21 shows the accelerator device 19, which serves as the pedal device, according to the nineteenth embodiment of the present disclosure. The accelerator device 19 includes the pedal pad 31, the strain gauge 32, the connector 33, the processor 34 and a hysteresis mechanism 30.

The hysteresis mechanism 30 is installed between the pedal pad 31 and the vehicle body 26 at the upper side of the pedal pad 31 in place of the spacer 313. The hysteresis mechanism 30 has hysteresis in the depressing force characteristic of the pedal pad 31. In the accelerator device 19, the hysteresis mechanism 30 acts to increase the pedal force at the time of depressing the pedal pad 31 and acts to decrease the depressing force at the time of releasing the depression of the pedal pad 31.

The accelerator device 19 of the nineteenth embodiment provides the advantage (a) of the first embodiment.

(l) Furthermore, in the accelerator device 19 of the nineteenth embodiment, the hysteresis mechanism 30 implements the difference between the depressing force at the time of depressing pedal pad 31 and the depressing force at the time of releasing the depression of the pedal pad 31. Thus, the driver can easily adjust the depression amount. As a result, the operability can be improved.

Twentieth Embodiment

Next, a pedal device according to a twentieth embodiment of the present disclosure will be described with reference to FIG. 22. The twentieth embodiment differs from the nineteenth embodiment with respect to an installed location of the strain gauge.

Figure 22:
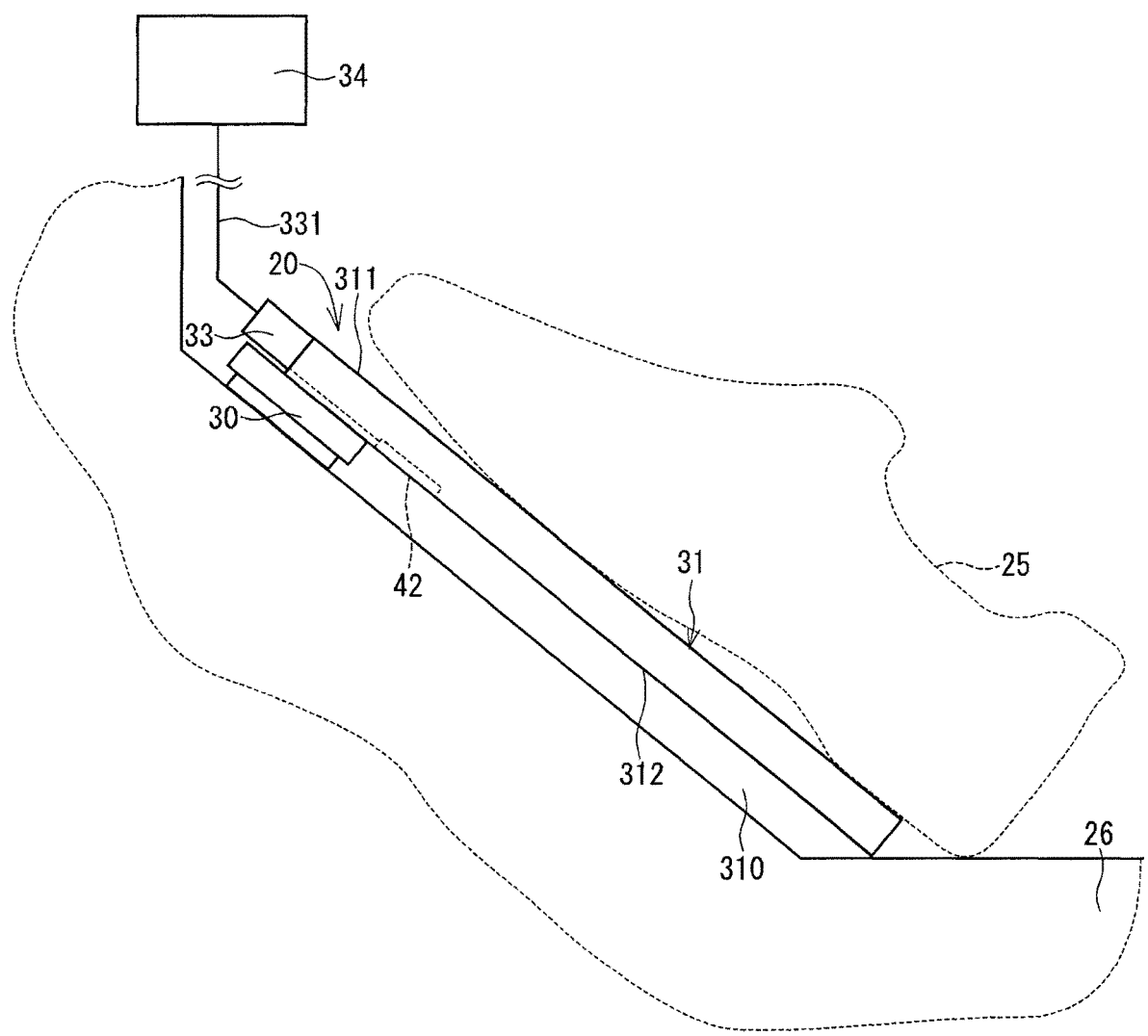
FIG. 22 is a schematic diagram of an accelerator device according to a twentieth embodiment of the present disclosure.

FIG. 22 shows the accelerator device 20, which serves as the pedal device, according to the twentieth embodiment of the present disclosure. The accelerator device 20 includes: the pedal pad 31; the strain gauge 42 installed to the back surface 312 side of the pedal pad 31; the connector 33; the processor 34; and the hysteresis mechanism 30. Thereby, the accelerator device 20 of the twentieth embodiment provides the advantage (a) of the first embodiment, the advantages (c), (d) of the third embodiment, and the advantage (l) of the nineteenth embodiment.

Twenty First Embodiment

Next, a pedal device according to a twenty first embodiment of the present disclosure will be described with reference to FIG. 23. The twenty first embodiment differs from the nineteenth embodiment with respect to the shape of the pedal pad.

Figure 23:
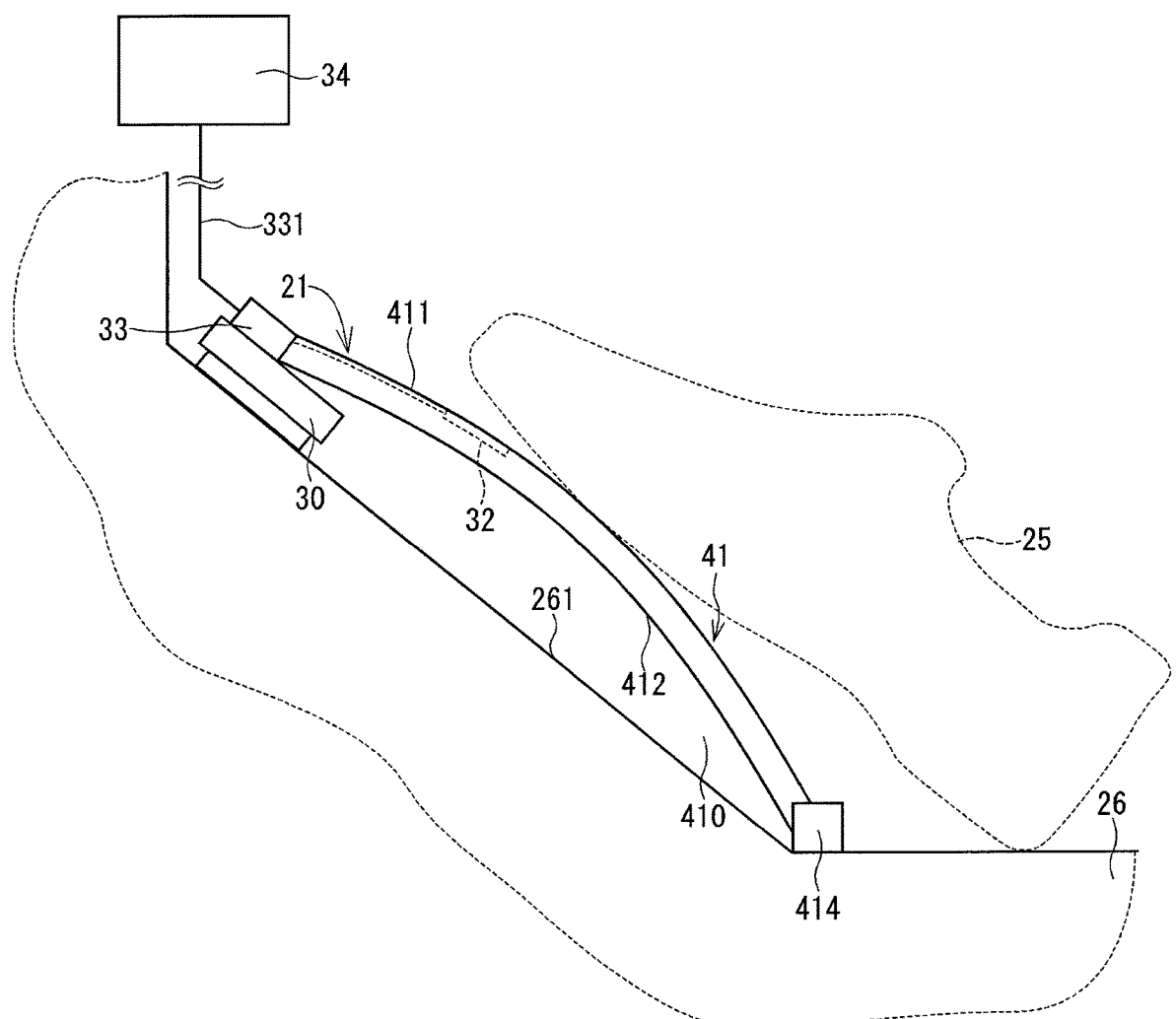
FIG. 23 is a schematic diagram of an accelerator device according to a twenty first embodiment of the present disclosure.

FIG. 23 shows the accelerator device 21, which serves as the pedal device, according to the twenty first embodiment of the present disclosure. The accelerator device 21 includes: the pedal pad 41 that is shaped into the curved form, which projects in the direction away from the inner wall surface 261 of the vehicle body 26; the strain gauge 32; the connector 33; the processor 34; and the hysteresis mechanism 30. Thereby, the accelerator device 21 of the twenty first embodiment provides the advantage (a) of the first embodiment, the advantage (e) of the fifth embodiment, and the advantage (l) of the nineteenth embodiment.

Twenty Second Embodiment

Next, a pedal device according to a twenty second embodiment of the present disclosure will be described with reference to FIG. 24. The twenty second embodiment differs from the twenty first embodiment with respect to an installed location of the strain gauge.

Figure 24:
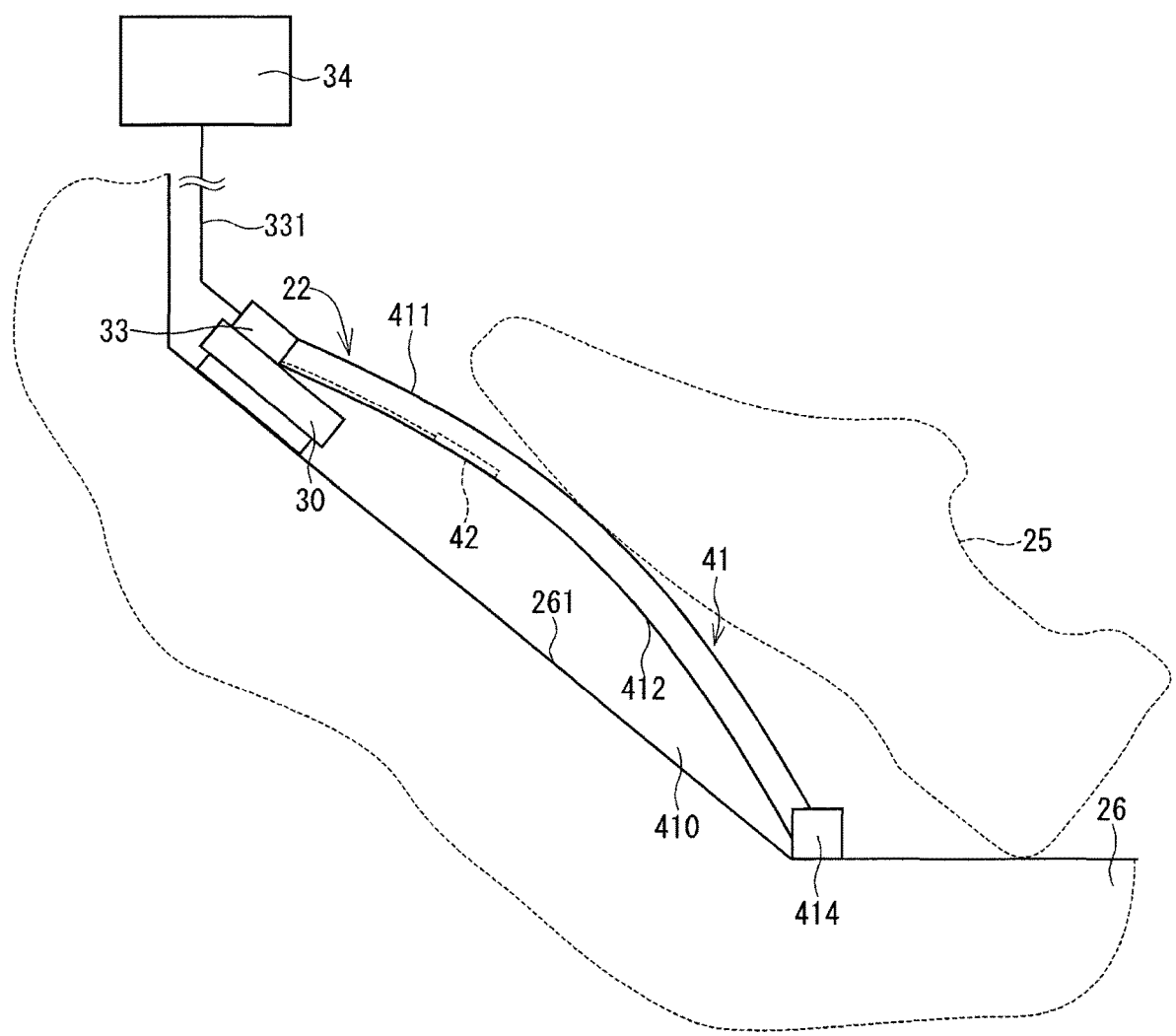
FIG. 24 is a schematic diagram of an accelerator device according to a twenty second embodiment of the present disclosure.

FIG. 24 shows the accelerator device 22, which serves as the pedal device, according to the twenty second embodiment of the present disclosure. The accelerator device 22 includes: the pedal pad 41; the strain gauge 42 installed to the back surface 412 side of the pedal pad 41; the connector 33; the processor 34; and the hysteresis mechanism 30. Thereby, the accelerator device 22 of the twenty second embodiment provides the advantage (a) of the first embodiment, the advantages (c), (d) of the third embodiment, the advantage (e) of the fifth embodiment, and the advantage (l) of the nineteenth embodiment.

Twenty Third Embodiment

Next, a pedal device according to a twenty third embodiment of the present disclosure will be described with reference to FIG. 25. The twenty third embodiment differs from the first embodiment with respect to the number of the strain gauges and the installed locations of the strain gauges.

Figure 25:
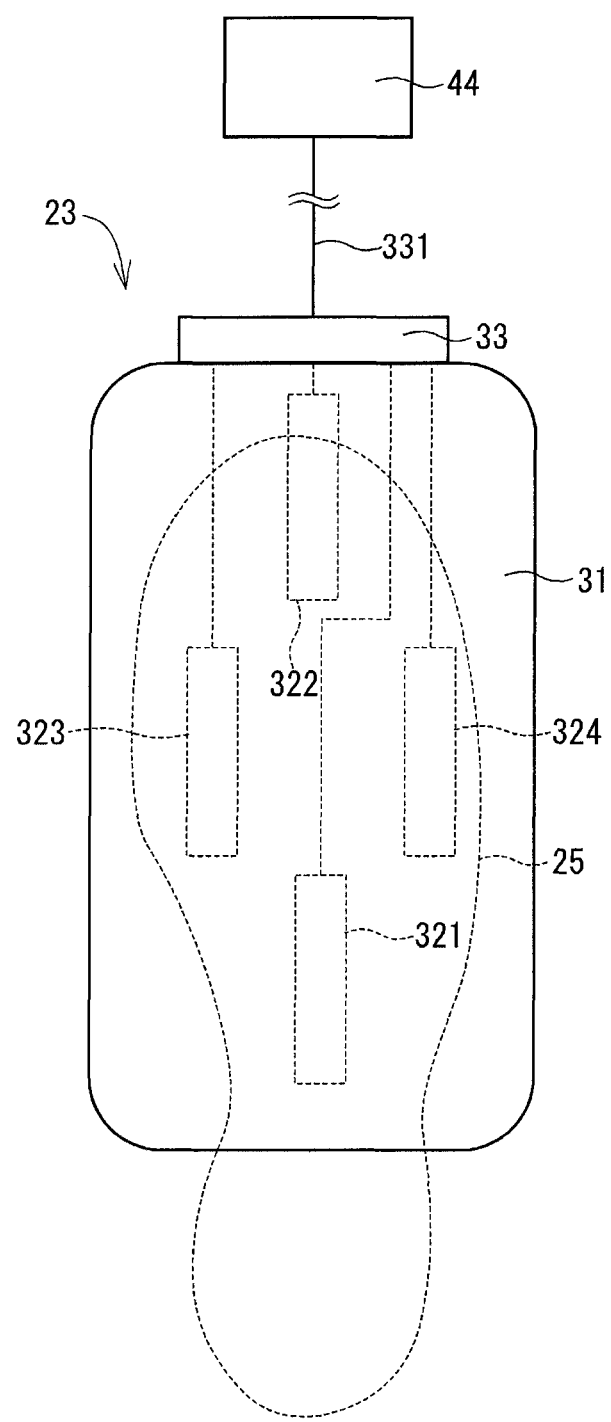
FIG. 25 is a schematic diagram of an accelerator device according to a twenty third embodiment of the present disclosure.

FIG. 25 shows the accelerator device 23, which serves as the pedal device, according to the twenty third embodiment of the present disclosure. The accelerator device 23 includes the pedal pad 31, the strain gauges (serving as displacement amount sensor devices) 321, 322, 323, 324, the connector 33 and the processor 44.

The strain gauges 321, 322, 323, 324 are installed to the front surface 311 side of the pedal pad 31. The strain gauges 321, 322, 323, 324 are installed at four sides, respectively, of the front surface 311.

In a view taken from the front side of pedal pad 31, the strain gauge 321 is generally positioned at the center of the lower side of the pedal pad 31. In the view taken from the front side of pedal pad 31, the strain gauge 322 is generally positioned at the center of the upper side of the pedal pad 31. In the view taken from the front side of pedal pad 31, the strain gauge 323 is generally positioned at the center of the left side of the pedal pad 31. In the view taken from the front side of pedal pad 31, the strain gauge 324 is generally positioned at the center of the right side of the pedal pad 31. The strain gauges 321, 322, 323, 324 sense the displacement amount of the pedal pad 31 at the installed locations of the strain gauges 321, 322, 323, 324, respectively, and output the electric signal, which corresponds to the sensed displacement amount, to the connector 33.

The processor 44 computes the displacement amount of the pedal pad 31 based on the electric signals, which are outputted from the connector 33. At this time, the processor 44 transmits a control signal(s) to the electronic control device such that the electronic control device executes different control operations for the displacement amounts of the pedal pad 31, which are respectively sensed with the strain gauges 321, 322, 323, 324.

In the accelerator device 23, for example, the displacement amount of the pedal pad 31 at the installed location of the strain gauge 321 is sensed with the strain gauge 321 and is transmitted to the electronic control device as the control signal that indicates an operation amount of a brake of the vehicle having the accelerator device 23. Similarly, the displacement amount of the pedal pad 31 at the installed location of the strain gauge 322 is sensed with the strain gauge 322 and is transmitted to the electronic control device as the control signal that indicates an operation amount of an accelerator of the vehicle. Furthermore, the displacement amount of the pedal pad 31 at the installed location of the strain gauge 323 is sensed with the strain gauge 323 and is transmitted to the electronic control device as the control signal that indicates an operation amount of a clutch of the vehicle. Furthermore, the displacement amount of the pedal pad 31 at the installed location of the strain gauge 324 is sensed with the strain gauge 324 and is transmitted to the electronic control device as the control signal for executing an on/off control operation of a cruise control system of the vehicle.

The accelerator device 23 of the twenty third embodiment provides the advantage (a) of the first embodiment.

(b) In the accelerator device 23 of the twenty third embodiment, the plurality of strain gauges 321, 322, 323, 324 is placed at the different locations of the front surface 311 of the pedal pad 31, so that the various operations can be carried out through the depressing operations on the pedal pad 31.

Other Embodiments

In the above embodiments, the pedal device is described as the accelerator device that controls the drive operation of the throttle valve of the vehicle. However, the technical field, in which the pedal device of the present disclosure is applied, should not be limited to this field. For example, the pedal device of the present disclosure may be applied to the operation of the brake or the clutch and may be applied to the various technical fields of controlling the drive operation based on the depression amount of the pedal pad, which is depressed by the foot of the operator.

In the above embodiments, the strain gauge is used as the displacement amount sensor device. However, the displacement amount sensor device should not be limited to this type. A sensor, which is capable of measuring a distance between the pedal pad and the vehicle body, may be used. It is only required to sense the displacement amount of the pedal pad depressed by the operator. For instance, a strain sensor using a carbon nanotube may be used.

In the second embodiment, the maximum value among the two displacement amounts, which are computed based on the two electric signals, is set by the processor as the displacement amount of the pedal pad, and the depression amount of the pedal pad is computed by the processor based on the maximum value among the two computed displacement amounts. However, the computation of the processor should not be limited to this. An average value of the two displacement amounts, which are computed based on the two electric signals, may be used as the displacement amount of the pedal pad, and the depression amount of pedal pad may be computed based on the average value of the two computed displacement amounts. Furthermore, the computation method of the processor should not be limited to this.

In the second and fourth embodiments, the two strain gauges are installed to the one pedal pad. Furthermore, in the twenty third embodiments, the four strain gauge are installed to the one pedal pad. However, the number of the strain gauges should not be limited to any of these numbers.

In the eleventh and twelfth embodiments, the urethane member is described as the expandable and contractible member. Furthermore, in the thirteenth and fourteenth embodiments, the spring is described as the expandable and contractible member. However, the expandable and contractible member should not be limited to this. It is only required that the member is made of the material that is expandable and contractible in response to the movement of the pedal pad, or the member has the shape that is expandable and contractible in response to the movement of the pedal pad.

In the twenty third embodiment, the four strain gauges have the functions of controlling the brake, the accelerator, the clutch and the cruise control system, respectively. However, the functions of the strain gauges should not be limited to these functions. For example, in a case where a shape of a shoe sole varies depending on a body shape of the driver and/or the way of walking (e.g., bow-legged, pigeon-toed), the strain gauge, which is provided to the left side or the right side of the pedal pad, may have a function of operating the brake or the accelerator.

The present disclosure should not be limited to any of the above embodiments and may be implemented in various forms without departing from the scope of the present disclosure.

What is claimed is:

1. A pedal device configured to be installed to a base including a first wall and a second wall extending upwardly at an angle from the first wall, the pedal device comprising:
   a pedal pad;
   a first portion;
   a second portion; and
   a displacement amount sensor device, wherein;
   the pedal pad is one-piece, monolithically formed and is made of a flexible material, and the pedal pad is deformable in a depressing direction of the pedal pad when an operator depresses the pedal pad;
   the first portion is configured to be installed to and contact the first wall, and the second portion is configured to be installed to and contact the second wall;
   the pedal pad is separable from the base;
   the displacement amount sensor device is a strain gauge and is configured to sense a displacement amount of the pedal pad and output a signal which corresponds to the displacement amount of the pedal pad;
   the displacement amount sensor device is installed along one of a front surface and a back surface of the pedal pad at a location between the first and second portions, and the front surface and the back surface are opposed to each other in the depressing direction of the pedal pad; and
   a center portion of the pedal pad, which is centered in a longitudinal direction of the pedal pad and is placed between the first portion and the second portion in the longitudinal direction, is configured to flex into a space directly defined between the center portion of the pedal pad and the second wall and contact the second wall when the center portion of the pedal pad is fully depressed against the second wall.

2. The pedal device according to claim 1, wherein the displacement amount sensor device is installed to the back surface of the pedal pad.

3. The pedal device according to claim 1, wherein
   the displacement amount sensor device is one of a plurality of displacement amount sensor devices installed to a plurality of locations of the pedal pad; and
   the pedal device further comprises a processor that is configured to compute the displacement amount of the pedal pad based on a plurality of signals that are respectively sensed with the plurality of displacement amount sensor devices and respectively correspond to displacement amounts of the plurality of locations of the pedal pad, at which the plurality of displacement amount sensor devices are respectively placed.

4. The pedal device according to claim 3, wherein the processor is configured to set an average value of the displacement amounts of the plurality of locations of the pedal pad, which are respectively indicated by the plurality of signals, as the displacement amount of the pedal pad.

5. The pedal device according to claim 3, wherein the processor is configured to set a maximum value among the displacement amounts of the plurality of locations of the pedal pad, which are respectively indicated by the plurality of signals, as the displacement amount of the pedal pad.

6. The pedal device according to claim 3, wherein the processor is configured to output different control signals that are respectively based on the displacement amounts of the plurality of locations of the pedal pad, which are respectively indicated by the plurality of signals.

7. The pedal device according to claim 1, wherein the pedal pad is curved.

8. The pedal device according to claim 7, wherein one of the first and second portions of the pedal device is movable along the base.

9. The pedal device according to claim 1, wherein the second portion of the pedal device is an expandable and contractible member that is placed between:
   the second wall of the base; and an end of the pedal pad, wherein the expandable and contractible member is expandable and contractible in the depressing direction of the pedal pad in response to a depressing operation of the pedal pad by the operator.

10. The pedal device according to claim 1, wherein the second portion of the pedal device is a hysteresis mechanism that is placed between:
the second wall of the base; and
an end of the pedal pad, wherein the hysteresis mechanism is operable to generate hysteresis of a depressing force characteristic in response to an amount of depressing force of the operator.

11. The pedal device according to claim 1, wherein:
the first and second portions of the pedal device are one of a spacer and a fixation end part.

12. The pedal device according to claim 1, wherein the pedal pad is shaped in a planar plate form.

13. The pedal device according to claim 1, wherein the longitudinal direction of the pedal pad is parallel to the second wall of the base.

14. The pedal device according to claim 1, wherein the displacement amount sensor device is one of a plurality of displacement amount sensor devices that are installed along at least one of the front surface and the back surface of the pedal pad at the location between the first and second portions.

15. The pedal device according to claim 14, wherein the plurality of displacement amount sensor devices is installed along the front surface of the pedal pad.

16. A pedal device comprising:
a pedal pad that is elongated and is made of a flexible material, wherein the pedal pad is deformable in a depressing direction of the pedal pad when an operator depresses the pedal pad; and
a displacement amount sensor device that is configured to sense a displacement amount of the pedal pad and output a signal which corresponds to the displacement amount of the pedal pad, wherein:
two end parts of the pedal pad, which are opposite to each other in a longitudinal direction of the pedal pad, are respectively supported by two portions of a base that are spaced from each other in the longitudinal direction of the pedal pad;
a center portion of the pedal pad located between the two end parts of the pedal pad in the longitudinal direction is configured to flex toward the base relative to the two end parts of the pedal pad when the operator depresses the center portion of the pedal pad toward the base;
the two end parts of the pedal pad are joined only through the center portion of the pedal pad to form the pedal pad in one-piece;
the displacement amount sensor device is one of a plurality of displacement amount sensor devices that are installed to a plurality of locations of the pedal pad, and the pedal device further comprises a processor that is configured to compute the displacement amount of the pedal pad based on a plurality of signals that are respectively sensed with the plurality of displacement amount sensor devices and respectively correspond to displacement amounts of the plurality of locations of the pedal pad, at which the plurality of displacement amount sensor devices are respectively placed; and
the processor is configured to set a maximum value among the displacement amounts of the plurality of locations of the pedal pad, which are respectively indicated by the plurality of signals, as the displacement amount of the pedal pad.

17. A pedal device configured to be installed to a base including a first wall and a second wall extending upwardly at an angle from the first wall, the pedal device comprising:
a pedal pad;
a first portion;
a second portion; and
a displacement amount sensor device, wherein:
the pedal pad is one-piece, monolithically formed and is made of a flexible material, and the pedal pad is deformable in a depressing direction of the pedal pad when an operator depresses the pedal pad;
the first portion and the second portion are configured to be installed to and contact the second wall;
the pedal pad is separable from the base;
the displacement amount sensor device is a strain gauge and is configured to sense a displacement amount of the pedal pad and output a signal which corresponds to the displacement amount of the pedal pad;
the displacement amount sensor device is installed along one of a front surface and a back surface of the pedal pad at a location between the first and second portions, and the front surface and the back surface are opposed to each other in the depressing direction of the pedal pad; and
a center portion of the pedal pad, which is centered in a longitudinal direction of the pedal pad and is placed between the first portion and the second portion in the longitudinal direction, is configured to flex into a space directly defined between the center portion of the pedal pad and the second wall and contact the second wall when the center portion of the pedal pad is fully depressed against the second wall.

18. The pedal device according to claim 17, wherein the displacement amount sensor device is one of a plurality of displacement amount sensor devices that are installed along at least one of the front surface and the back surface of the pedal pad at the location between the first and second portions.

* * * * *